United States Patent [19]
Reynolds

[11] Patent Number: 5,987,705
[45] Date of Patent: Nov. 23, 1999

[54] HANDLE COVERING WITH VIBRATION-REDUCING BLADDER

[75] Inventor: Douglas D. Reynolds, Las Vegas, Nev.

[73] Assignee: Ergoair, Inc., Las Vegas, Nev.

[21] Appl. No.: 08/886,991

[22] Filed: Jul. 2, 1997

Related U.S. Application Data

[63] Continuation-in-part of application No. 08/565,921, Dec. 1, 1995, Pat. No. 5,771,490, which is a continuation-in-part of application No. 08/367,468, Dec. 30, 1994, Pat. No. 5,537,688.

[51] Int. Cl.⁶ ........................................................ B25G 1/01
[52] U.S. Cl. ..................... 16/431; 16/DIG. 12; 74/551.9; 74/558.5; 2/16
[58] Field of Search ................................ 2/16; 16/110 R, 16/116 A, 116 R, 114 R; 74/543, 551.1, 551.8, 551.9, 558.5; 273/75, 73 J, 67 DA; 473/300

[56] References Cited

U.S. PATENT DOCUMENTS

| | | | |
|---|---|---|---|
| 3,008,214 | 11/1961 | Foster et al. | 2/DIG. 3 X |
| 3,098,563 | 7/1963 | Skees | 2/DIG. 3 X |
| 3,911,501 | 10/1975 | Seltzer | 128/260 |
| 4,183,156 | 1/1980 | Rudy | 36/44 |
| 4,471,538 | 9/1984 | Pomeranz et al. . | |
| 4,478,408 | 10/1984 | Bruckner . | |
| 4,509,228 | 4/1985 | Landsberger | 16/114 R |
| 4,545,841 | 10/1985 | Jackrel . | |
| 4,547,919 | 10/1985 | Wang | 2/413 X |
| 4,820,090 | 4/1989 | Chen . | |
| 4,912,861 | 4/1990 | Huang | 36/29 |
| 4,918,754 | 4/1990 | Leatherman et al. . | |
| 4,942,791 | 7/1990 | Stewart et al. . | |
| 5,018,733 | 5/1991 | Buand | 273/75 |
| 5,142,717 | 9/1992 | Everard et al. | 5/450 |
| 5,155,864 | 10/1992 | Walker et al. | 2/18 |
| 5,157,807 | 10/1992 | Keller et al. . | |
| 5,193,246 | 3/1993 | Huang | 16/114 R |
| 5,195,212 | 3/1993 | Colwell . | |
| 5,218,719 | 6/1993 | Johnson | 2/19 |
| 5,257,418 | 11/1993 | Jaskiewicz | 2/20 |
| 5,274,846 | 1/1994 | Kolsky | 2/16 X |
| 5,345,609 | 9/1994 | Fabry et al. | 2/20 |
| 5,355,552 | 10/1994 | Huang | 16/114 R |
| 5,427,577 | 6/1995 | Picchietti et al. | 473/59 |
| 5,511,445 | 4/1996 | Hildebrandt | 74/558.5 |
| 5,603,118 | 2/1997 | Solomon | 2/DIG. 2 X |
| 5,713,104 | 2/1998 | Giampaolo, Jr. | 16/114 R |
| 5,846,629 | 12/1998 | Gwinn | 74/551.1 |

FOREIGN PATENT DOCUMENTS

| | | |
|---|---|---|
| 333946 | 12/1903 | France ........................................ 2/16 |
| 3326085 A1 | 4/1985 | Germany . |
| 961646 | 9/1982 | Russian Federation ..................... 2/16 |
| 1623590 | 1/1991 | Russian Federation ..................... 2/16 |
| 1651831 | 5/1991 | Russian Federation ..................... 2/16 |
| 1764615 | 9/1992 | Russian Federation ..................... 2/16 |
| 1818058 | 5/1993 | Russian Federation ..................... 2/16 |

*Primary Examiner*—Michael A. Neas
*Attorney, Agent, or Firm*—Kinney & Lange, P.A.

[57] ABSTRACT

An air isolation hand or handle covering has a bladder consisting of a plurality of interconnected or independent inflation cells that is positioned between the hand and a hand-held tool or other vibrating object. The cells are oriented to permit easy bending of the hand covering in directions appropriate for grasping an object. The effectiveness of the bladder in reducing the vibration energy transmitted to the hand is a function of the bladder material thickness, the shape and configuration of the bladder, the pressure in the bladder, the compressible fluid used, the volume of the bladder, and the grip force and push force used when clasping a tool or other object. The bladder is attached in place by way of an attachment tab which is integrally formed from at least one of the layers of the bladder and extends for at least about one sixth the length of the fluid cavity. Spacing between weld lines which define the inflation cells can be varied such that the thickness of the bladder in an inflated state varies at different inflation cells. The bladder can be filled with air or other fluid during the fabrication of the bladder or it can be inflated or deflated with a small pump and integral air valve connected to one of the air cavities. The covering may include an inflation sensor to indicate when a proper inflation pressure is reached.

23 Claims, 34 Drawing Sheets

SECTION 5-5

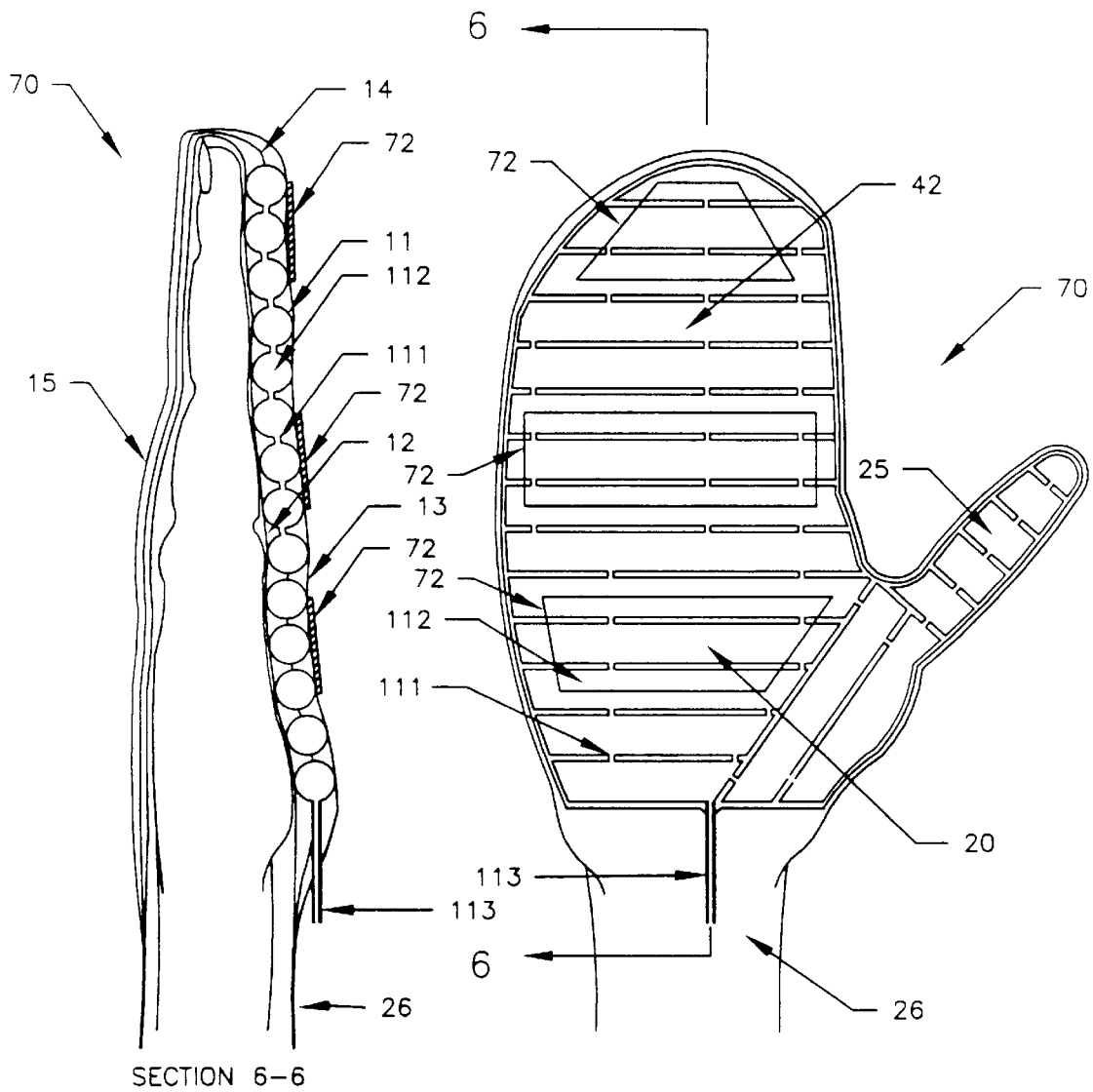

SECTION 10.2-10.2

SECTION 18.2-18.2

HANDLE COVERING WITH VIBRATION-REDUCING BLADDER

This is a continuation in part of application Ser. No. 08/565,921, filed Dec. 1, 1995, now U.S. Pat. No. 5,771,490, which is a continuation in part of application Ser. No. 08/367,468, filed Dec. 30, 1994, now U.S. Pat. No. 5,537,688, issued Jul. 23, 1996.

BACKGROUND OF THE INVENTION

Many individuals are exposed to hand-induced vibration by using hand-held vibrating or repeated impact-type tools that include, but are not limited to, chipping hammers, jackhammers, riveters, jackleg drills, rotary grinders and sanders, orbital sanders, chain saws, lawn mowers, and engine-powered string trimmers. Individuals can also be exposed to hand-induced vibration through clasping objects in their hands that are being ground, swagged, or repeatedly hammered. Finally, individuals can be exposed to hand-induced vibration while riding motor cycles, motor bikes, all-terrain vehicles, and other like vehicles.

Individuals who are exposed to hand-induced vibration or repetitive impacts over short periods of time can experience tingling and numbness in the fingers and hand fatigue. If individuals are exposed to high levels of hand-induced vibration over prolong periods of time, vibration-induced white fingers (VWF) can develop. This disease results in a destruction of the small blood vessels in the fingers, and it can be debilitating and cause severe pain in extreme cases. The occurrence of tingling, numbness and fatigue in the hand and fingers and of VWF can be minimized by reducing the levels of vibration energy directed into the hands of individuals who use vibrating or repeated impact-type hand tools or who clasp objects that direct vibration or repetitive impacts into the hand.

Vibration levels can be reduced by redesigning the tool or object or by placing a vibration isolation device between the hand and the tool or object that is being clasped by the hand. One of the methods for reducing the vibration energy directed into the hands has been the use of gloves that have an elastomer, foam or rubberlike material placed between the vibrating tool or object and the hand. Another method has involved wrapping the tool handle with an elastomer, foam or rubberlike material which performs the same function as performed by the same material used in a glove. Hand coverings such as gloves and handle coverings made with elastomers or rubberlike materials have proven to be ineffective in significantly reducing the vibration energy transmitted to hands from vibrating hand tools or objects clasped by the hand. To improve the vibration isolation characteristics of gloves with elastomers or rubberlike materials, it is necessary to make the elastomer or rubber pads used in the gloves very thick. This often makes the glove stiff and very difficult to use in clasping a hand tool or other object. Also, using gloves with thick elastomer or rubber pads causes the hands to become fatigued in a very short period of time.

Use of thick elastomers as tool handle coverings has also been problematic. To achieve acceptable comfort in clasping a tool handle with the hand, the overall diameter of the tool handle with an elastomer pad must be held within specified limits, such as a preferred diameter of 1.5 inches. Thick elastomer pads may be bent or wrapped around small diameter handles. Bending or wrapping is often difficult, since the circumference of the inside of the pad in contact with the handle is substantially less than the circumference of the outside of the pad in contact with the hand.

To avoid bending or wrapping problems, thick elastomer pads that are used on small-diameter tool handles may be pre-molded or pre-formed into a cylindrical shape. The pre-molding process is often expensive and restricts the use of a pre-molded or pre-formed pad to a single-size handle and a single handle configuration. In either the wrapped or the pre-molded form, thick elastomers pads used on tool handles also quickly deteriorate under the severe working conditions in which tools exposed to high levels of vibration are commonly used.

Pre-molded elastomer air bladders have been proposed for use in attenuating shock directed into the hand. The injection mold process used to make pre-molded air bladders is very expensive, and as with pre-molded thick elastomer pads, pre-molded elastomer air bladders are restricted to single size and single handle configurations. The bladder material of pre-molded elastomer air bladders is usually fairly thick, such as 0.010 inches or thicker. The increased bladder material thickness significantly reduces the effectiveness of pre-molded air bladders in reducing the vibration transmitted to the hand from a tool handle.

Regardless of whether thick or thin handle coverings are used, and regardless of whether the covering is formed flat or circular, attachment of the handle covering to the handle may be difficult or inefficient. The handle covering needs to be tightly secured to the handle so there is no relative movement between the handle and the handle covering either in a rotational or in an axial sense, while still permitting the radial compression needed for adequate vibration attenuation.

The occurrence of VWF is significantly affected by a cold environment. VWF is more prevalent in areas where workers must work either outside or inside in a cold environment. Gloves are often used in these environments to warm the hands, reducing the effects of cold on the prevalence of VWF in these environments. Using gloves with elastomer or rubberlike pads that are also designed to keep the hands warm creates the same problems that are associated with gloves that have extremely thick elastomer or rubberlike pads. The gloves tend to be stiff and often make it difficult to easily clasp a hand tool or other object.

European standards have recently been promulgated which pose requirements for a protection device marketed in Europe to be properly classified as a "vibration protection glove" or an "antivibration glove." These standards are outlined in European Standard prEN ISO 10819 (1995), *Mechanical Vibration and Shock—Hand-arm Vibration—Method for the Measurement and Evaluation of the Vibration Transmissibility of Gloves at the Palm of the Hand*. To meet the standard, a glove must have an overall time-averaged vibration transmissibility in the frequency range from 32 Hz to 200 Hz, $TR_M$, of less than 1.0, and an overall time-averaged vibration transmissibility in the frequency range from 200 Hz to 1,250 Hz, $TR_H$, of less than 0.6. The vibration transmissibility in the standard is defined as the ratio of the vibration amplitude directed into the palm of the hand with the glove divided by the vibration amplitude directed into the palm of the hand without the glove. The standard specifies that vibration transmissibility is to be measured while the vibration test handle is being clasped with a grip force of 5 lb (25 N) and while the hand is pushing on the vibration test handle with a push force of 10 lb (50 N).

Hand and handle coverings are desired which will more effectively reduce the vibration transmitted to the hand from the hand-held object, and will furthermore be thin, flexible, thermally insulative and relatively inexpensive.

SUMMARY OF THE INVENTION

The problems associated with hand and handle coverings that contain elastomer or rubberlike pads or that are made from pre-molded air bladders are solved with the air isolation hand and handle coverings of the present invention. The air isolation coverings contain a bladder made from thin, flexible thermoplastic sheet material to be filled with air or other compressible fluid. The bladder has weld lines which define a plurality of interconnected or independent inflation cells, for placement between the hands and a tool or other object when the hands clasp the object. The bladder is attached by way of a first attachment portion which is integrally formed from at least one of the layers of the bladder and extends for at least about one sixth the length of the fluid cavity. A second attachment portion extending from the other end of the bladder may also be used. In another aspect of the invention, weld line spacing varies such that the thickness of the bladder in an inflated state varies at different inflation cells.

BRIEF DESCRIPTION OF THE DRAWINGS

FIG. 1-2 is a plot of the measured vibration transmissibility of a 0.17 inch thick bladder as a function of bladder material thickness.

FIG. 1-3 is a plot of the calculated vibration transmissibility of a 0.375 inch thick bladder as a function of bladder material thickness.

FIG. 2-1 is a plan view of a first embodiment of the air isolation hand covering of the present invention showing the bladder configuration.

FIG. 2-2 is a cross-sectional view of the first embodiment of the air isolation hand covering taken along line 2—2 in FIG. 2-1.

FIG. 3-1 is a plan view of a second embodiment of the air isolation hand covering of the present invention showing the bladder configuration.

FIG. 3-2 is a cross-sectional view of the second embodiment of the air isolation hand covering taken along line 3—3 in FIG. 3-1.

FIG. 4-1 is a plan view of a third embodiment of the air isolation hand covering of the present invention showing the bladder configuration.

FIG. 4-2 is a cross-sectional view of the third embodiment of the air isolation hand covering taken along line 4—4 in FIG. 4-1.

FIG. 5-1 is a plan view of a fourth embodiment of the air isolation hand covering of the present invention showing the bladder configuration.

FIG. 5-2 is a cross-sectional view of the fourth embodiment of the air isolation hand covering taken along line 5—5 in FIG. 5-1.

FIG. 6-1 is a plan view of a fifth embodiment of the air isolation hand covering of the present invention showing the bladder configuration.

FIG. 6-2 is a cross-sectional view of the fifth embodiment of the air isolation hand covering taken along line 6—6 in FIG. 6-1.

FIG. 8-1 is a plan view of a sixth embodiment of a bladder for the air isolation hand covering of the present invention.

FIG. 8-2 is a cross-sectional view of the sixth embodiment of the air isolation hand covering taken along line 8.2—8.2 in FIG. 8-1.

FIG. 8-3 is an uninflated cross-sectional view of FIG. 8-2.

FIG. 8-4 is a cross-sectional view of the sixth embodiment of the air isolation hand covering taken along line 8.4—8.4 in FIG. 8-2.

FIG. 8-5 is an enlarged plan view of a portion of the palm of the bladder of FIG. 8-1.

FIG. 8-6 is a cross-sectional view of the sixth embodiment of the bladder taken along line 8.6—8.6 in FIG. 8-5.

FIG. 8-7 is a cross-sectional view of the sixth embodiment of the bladder taken along line 8.7—8.7 in FIG. 8-5.

FIG. 8-8 is an uninflated cross-sectional view of FIG. 8-7.

FIG. 9-1 is an expanded cross-section view of the tip of the finger showing the attachment tab.

FIG. 9-2 is an expanded cross-section view of the tip of the finger showing the attachment tab.

FIG. 9-3 is an expanded cross-section view of the tip of the finger showing the attachment tab.

FIG. 10-1 is a plan view of a seventh embodiment of a bladder for the air isolation hand covering of the present invention.

FIG. 10-2 is a cross-sectional view of the sixth embodiment of the air isolation hand covering taken along line 10.2—10.2 in FIG. 10-1.

FIG. 10-3 is an enlarged plan view of a portion of the palm of the bladder of FIG. 10-1.

FIG. 10-4 is a cross-sectional view of the seventh embodiment of the bladder taken along either line 10.4—10.4 in FIG. 10-3.

FIG. 10-5 is a cross-sectional view of the seventh embodiment of the bladder taken along line 10.5—10.5 in FIG. 10-3.

FIG. 10-6 is a cross-sectional view of the seventh embodiment of the bladder taken along line 10.6—10.6 in FIG. 10-3.

FIG. 11-1 is a plan view of an eighth embodiment of a bladder for the air isolation hand covering of the present invention.

FIG. 11-2 is a plan view of a portion of the palm of the bladder of FIG. 11-1.

FIG. 11-3 is a cross-section view of the bladder taken along line 11.3—11.3 of FIG. 11-2.

FIG. 11-4 is a cross-section view of the bladder taken along line 11.4—11.4 of FIG. 11-2.

FIG. 16-1 is a plan view of an eleventh embodiment of a bladder for use in a handle covering of the present invention.

FIG. 16-2 is a cross-section view of the bladder of FIG. 16-1 taken along line 16.2—16.2.

FIG. 18-1 is a plan view of an eleventh embodiment of a bladder for use in a handle covering of the present invention.

FIG. 18-2 is a cross-section view of the bladder of FIG. 18-1 taken along line 18.2—18.2.

While the above-identified drawing figures set forth alternative embodiments, other embodiments of the present invention are also contemplated, some of which are noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The present invention is a hand and handle covering which uses a bladder inflated with a compressible fluid to reduce vibration transmission through the hand or handle covering, and further provide substantial thermal insulation benefits. While further discussion of the invention will refer to "air" as the compressible fluid being used, workers skilled in the art will recognize that any compressible fluid could be substituted for air within the spirit of the invention.

Figure 1:
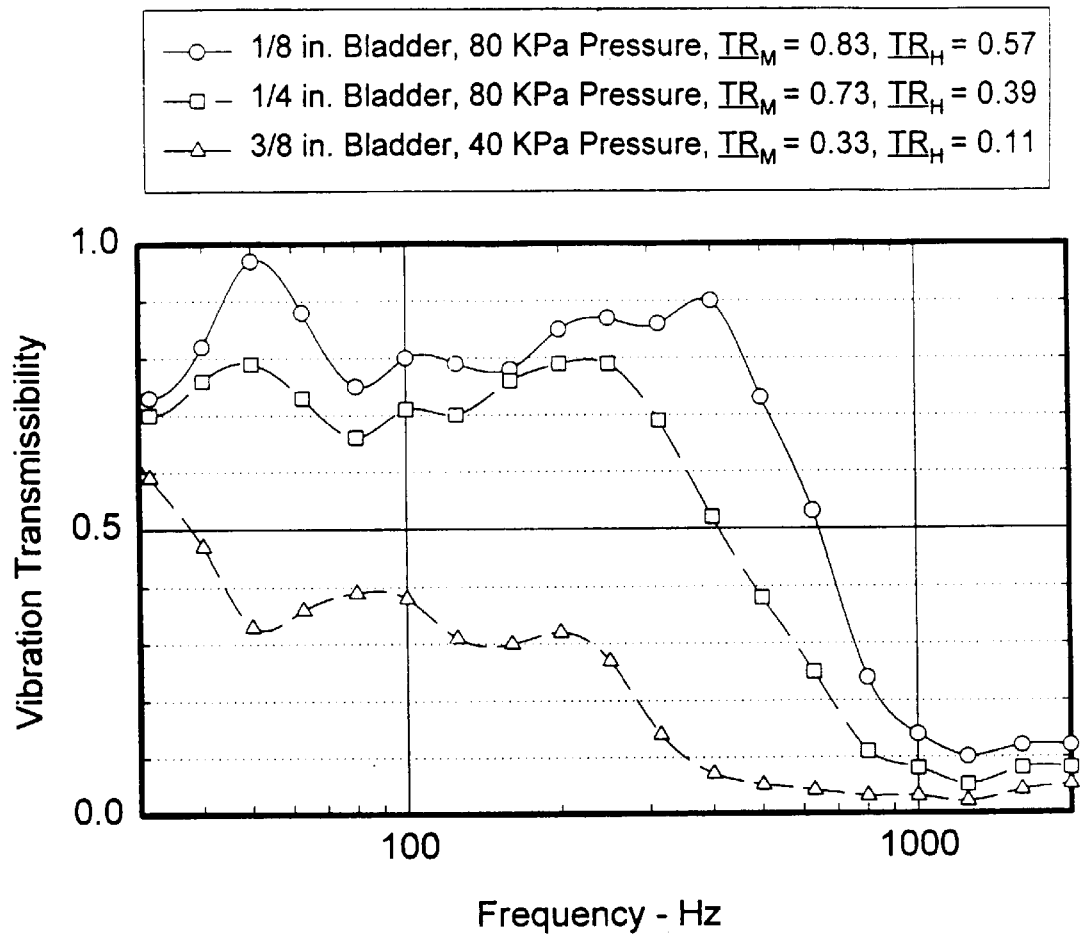
FIG. 1-1 is a plot of the measured vibration transmissibility of three different air bladder configurations.
Figures 1, 2:
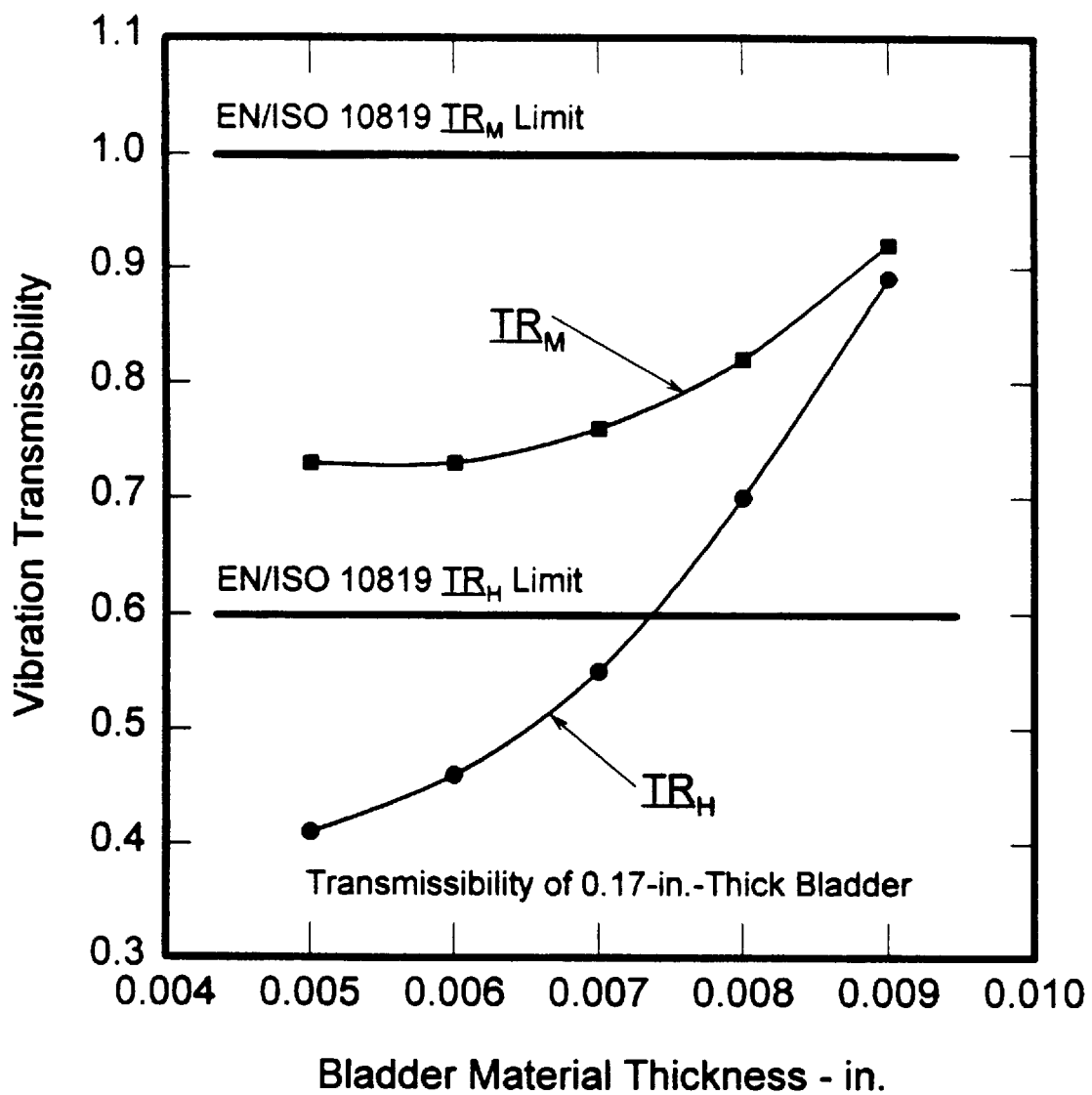
Figures 1, 2, 3:
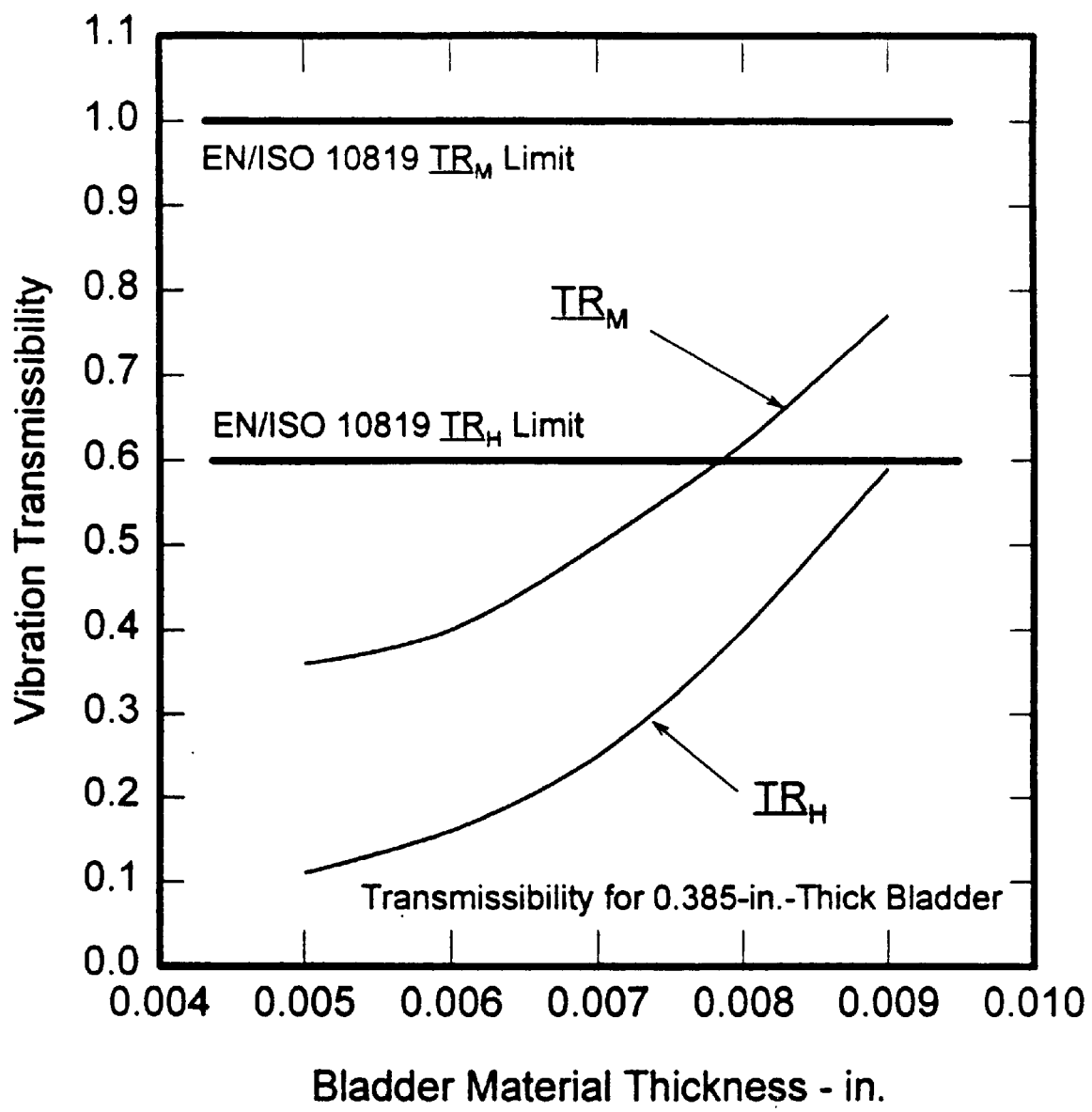
Figures 1, 2:
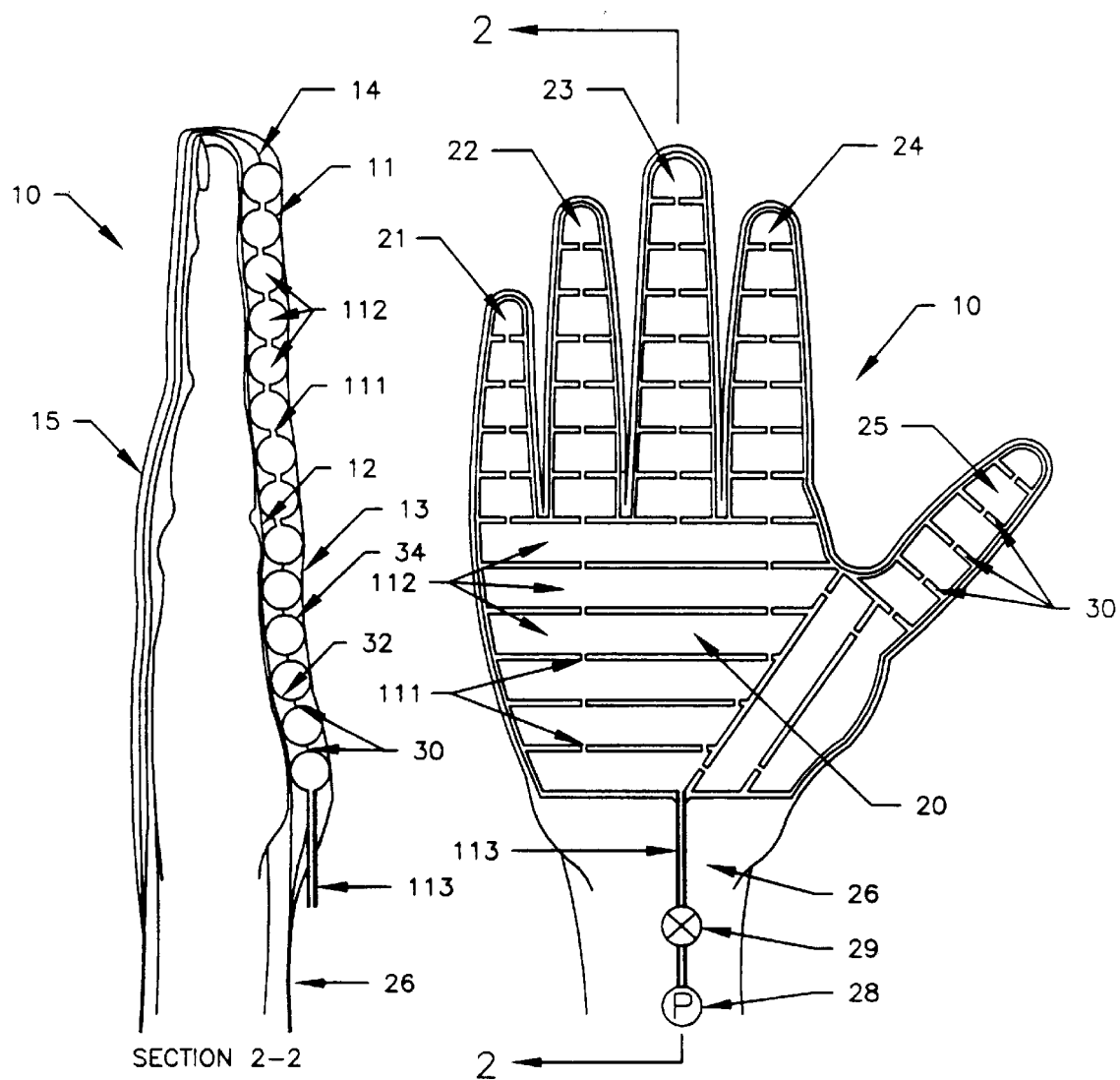
Figures 1, 2, 3:
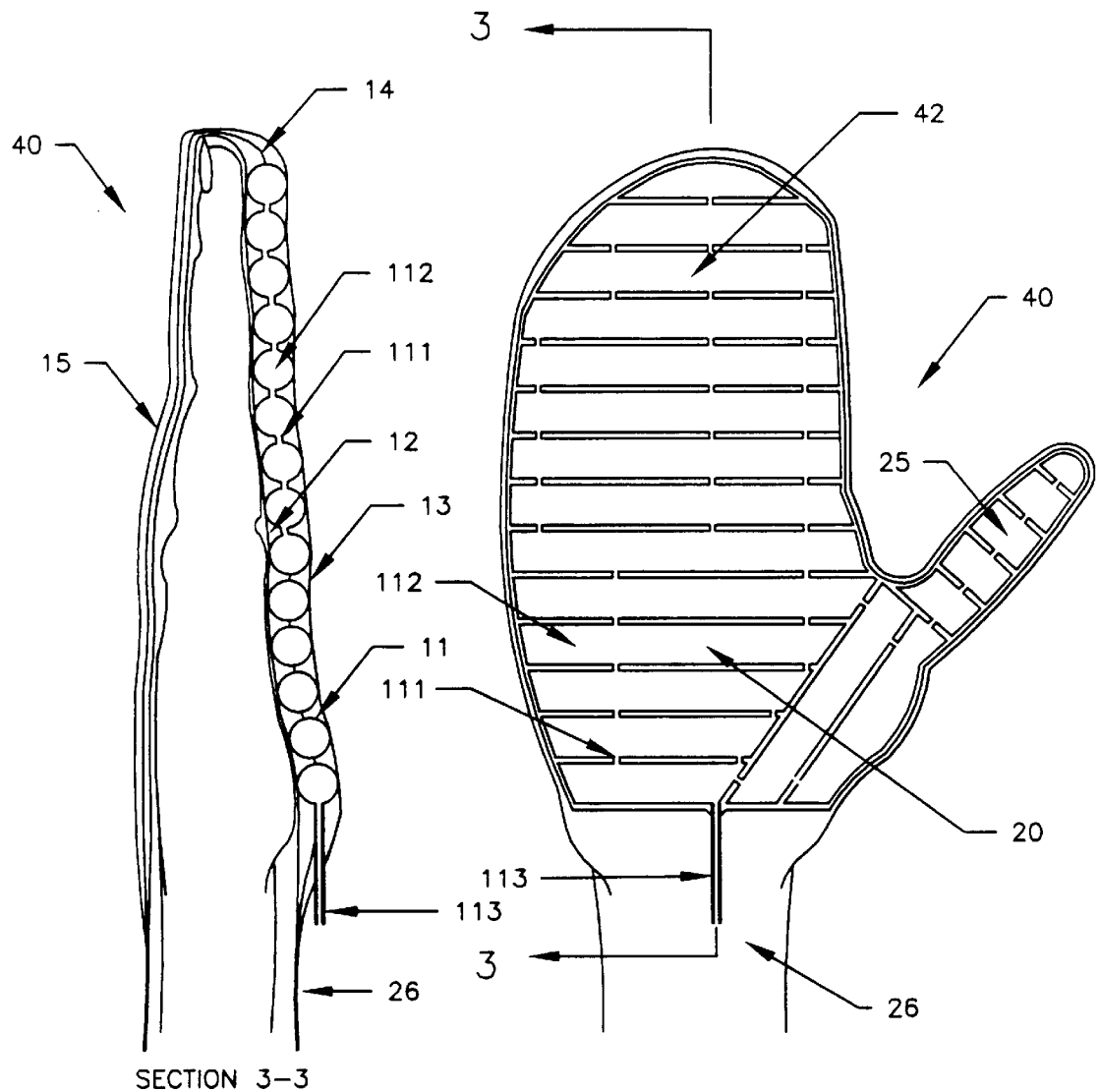

The effectiveness of an air isolation bladder in reducing vibration energy directed into the hand is illustrated in FIGS. 1-1, 1-2 and 1-3. For each of FIGS. 1-1, 1-2 and 1-3, medium frequency range (32 to 200 Hz) vibration transmissibility ($TR_M$) and high frequency range (200 to 1,250 Hz) vibration transmissibility ($TR_H$) are defined in accordance with EN/ISO 10819 (1995). The vibration transmissibility in FIGS. 1-1, 1-2 and 1-3 is the ratio of the vibration amplitude directed into the palm of the hand with the bladder divided by the vibration amplitude directed into the palm of the hand without the bladder. The values are nearly the same for the cases where the bladder is inserted in a glove or wrapped around a handle.

FIG. 1-1 shows tested vibration transmissibility as a function of vibration frequency for three different air bladder configurations. Each of the air bladder configurations consist of a plurality of interconnected air cells, similar to those shown in FIGS. 2–6, 8 and 10. The tested bladders had an overall bladder thicknesses when inflated of ⅛ in. (3.2 mm), ¼ in. (6.4 mm), and ⅜ in. (9.5 mm), respectively, and were inflated to pressures of between 5.8 psi (40 kpa) and 11.6 psi (80 kpa). The larger the diameter of the plurality of interconnected air cavities in the bladder, the greater the air volume of the inflated bladder.

The first embodiment of an air isolation hand or handle covering of the present invention is shown in FIG. 2. Glove 10 consists of a palm portion 20, finger stalls 21, 22, 23 and 24, a thumb stall 25, and a gauntlet 26. The air isolation glove has an inner liner 12 that is cut and formed into a hand covering structure. The inner liner 12 is of a soft, moisture-absorbing material, such as cotton, GORETEX®, Lycra® or other like material Inner liner 12 provides comfort when placed against a user's palm, absorbs any sweat from the palm, and helps prevent any rash or dermatitis from forming on the fingers, thumb, or palm of the hand. The outer covering layer 13 is of a protective, wear-resistant material such as leather, cloth or other like material. Alternatively, the inner liner 12 and the outer covering layer 13 may be of the same material, depending on the environment in which the glove will be used. Placed between the inner liner 12 and the outer covering layer 13 in the inside palm portion 20 and finger and thumb stalls 21, 22, 23, 24, and 25 is an air bladder 11. If desired the material 14 of the air bladder 11 may extend to the back side 15 of the glove 10.

Air bladder 11 includes a plurality of air cavities or cells 112. Cells 112 are defined by cell divisions 30, where the inner layer 32 and outer layer 34 of bladder 11 are joined. Air bladder 11 may be made of any flexible, air-tight material. The air bladder 11 is preferably made from two layers of a thin thermoplastic material, with the preferred thermoplastic material being ether-based urethane which has a durometer hardness of from 80 to 85.

FIG. 1-2 shows measured values for vibration transmissibility for a bladder with an overall thickness of 0.17 inch (4.3 mm), as a function of the thickness of the bladder material. FIG. 1-3 shows the same vibration transmissibility curves for a bladder with an overall thickness of 0.375 inch (8.6 mm), with the values plotted being calculated based on the measured data reported in FIGS. 1-1 and 1-2. As shown in FIGS. 1-2 and 1-3, even when the overall thickness of the bladder remains constant, the ability of the bladder to attenuate vibration and particularly high frequency vibration changes drastically and in a nonlinear fashion based on the thickness of the bladder material used. Regardless of the overall thickness of the bladder, both transmissibilities $TR_M$ and $TR_H$ approach a value of one as the material thickness is increased to 0.010 inches, which means that nearly all of the vibration incident on the bladder is transmitted to the hand. To simultaneously meet the requirements of EN/ISO 10819 (1995) for both $TR_M$ and $TR_H$, the thickness of the material for the 0.385 inch bladder should be less than 0.009 inches, and the thickness of the material for the 0.17 inch bladder should be less than 0.008 inches. The preferred thickness is in the range of about 0.005 to 0.007 inches, with the most preferred thickness being at about 0.006 inches. Use of a material thicker than this preferred range, such as a material of 0.010 inches, causes significant degradation of the vibration attenuation properties of the bladder. Use of a material thinner than 0.005 inches causes manufacturing and wear problems due to the increase propensity of the material to tear or rip during handling.

Depending on the material of air bladder 11, cell divisions 30 may be formed by adhesive, by application of heat and/or pressure to join or weld the material of bladder 11, or by other processes. Air bladder 11 is manufactured in a uninflated state by joining the two layers of thermoplastic. It is preferred that cell divisions 30 be as narrow as possible, such that inner layer 32 generally defines a flat surface adjacent the hand and outer layer 34 generally defines a flat surface facing outward from the hand. The material of air bladder 11 should generally be flexible so that cells 112 can easily conform to objects clasped by the hand.

Cells 112 are linear, and are generally arranged in a planar configuration to cover the surface of palm portion 20, finger stalls 21, 22, 23 and 24, and thumb stall 25. Cells 112 may not entirely cover these surfaces. For instance, only 50% of the palm portion 20 may be covered. Similarly, cells 112 may not cover one or more of these surfaces at all. For instance, it may not be necessary to cover finger stalls 21, 22, 23 and 24. However, substantial coverage is desired for all portions of the hand that will contact the vibrating object.

For many applications, it is unnecessary to include any cells 112 on the back side 15 of the glove 10. However, cells 112 provide significant thermal insulation for the hand, and it may be desired to include cells 112 on the back side 15 of the glove 10 for applications in cold environments.

The cross-sectional shapes of the air cells 112 can be circular as shown in FIG. 2-2. The cross-sectional shape of the air cells 112 may also be triangular, square, hexagonal, octagonal, etc. The air bladder cavities 112 in the palm portion 20 and the finger and thumb stalls 21, 22, 23, 24 and 25 can have the same cavity cross-sectional shape (circular, triangular, square, hexagonal, octagonal, etc.) or can have a mixture of cavity cross-sectional shapes (circular, triangular, square, hexagonal, octagonal, etc.). The cross-sectional dimensions of the air bladder cavities in the palm portion 20 and the finger and thumb stalls 21, 22, 23, 24 and 25 can all be the same or they can be different. The cross-sectional shapes and related dimensions of the air cavities in the palm portion 20 and the finger and thumb stalls 21, 22, 23, 24 and 25 can be varied to permit the air isolation glove to be configured to accommodate different glove applications.

The cells 112 may be interconnected through air passages 111 or may be independent. If the cells 112 are independent, they do not communicate with each other and they each have a certain pressure. Independent air cells 112 will generally be inflated during manufacture of glove 10.

If the air cavities are interconnected, they can be made to communicate with each other through small air passages 111 that are molded into the bladder. This fluid communication allows bladder 11 to be inflated and deflated from a single source after manufacture of glove 10. The air passages 111 can be small orifices between layers 32 and 34 that allow adjacent air cavities 112 to communicate. Air passages 111 can be small elastic tubes placed between adjacent air cavities 112 that allow them to communicate with each other. The connection of adjacent cells 112 by air passages 111 can allow the air pressure in the plurality of interconnected air cavities 112 to adjust or equalize as the glove 10 clasps a tool handle or other object. Alternatively, air passages 111 may be formed so as to close when glove 10 is flexed or curled about a tool handle or other object. These closing air passages 111 allow inflation and deflation of bladder 11 from a single source, but do not allow fluid communication between adjacent cells 112 during use.

Adjacent cells 112 can be parallel to each other or they can be oriented at differing angles relative to each other, as is show in FIG. 2-1 where the thumb stall 25 is connected to the palm portion 20. During inflation, cells 112 will resist bending or flexing, but cell divisions 30 will provide joints which allow bending between cells 112. The orientation of cells 112 and cell divisions 30 can generally be chosen to allow more easy flexing of glove 10 for its intended use. In the configuration shown, cell divisions 30 allow ready downward curling of finger stalls 21, 22, 23 and 24. Cell divisions 30 also allow ready bending of thumb stall 25 diagonally inward, and allow ready opposable bending between the thumb stall 25 and palm portion 20.

If the air cavities 112 are interconnected, the air bladder 11 can be filled through a small hollow tube 113 attached to the endmost air cavity of the palm section 20 or to any other air cavity. The air bladder 11 can also be inflated with a small manual pump 28 (shown schematically) attached to the hollow tube 113. A check and air-release valve 29 (shown schematically) attached between the small manual pump 28 and the hollow tube 113 can be used to adjust the interior air pressure in the air bladder 11. Regardless of whether cells 112 are independent or interconnected, bladder 11 may also be inflated and completely sealed during manufacture having a certain interior air pressure. If bladder 11 is completely sealed, it would not be necessary to provide any inflating valve or pump.

A second embodiment of the air isolation hand and handle covering is shown in FIG. 3. Mitten 40 consists of a palm portion 20, a finger portion 42, a thumb stall 25, and a gauntlet 26. With the exception of the difference between the finger portion 42 of the second embodiment of the present invention and the finger stalls 21, 22, 23 and 24 of the first embodiment of the present invention, the construction of the second embodiment of the present invention is the same as the first.

Figures 1, 2, 4:
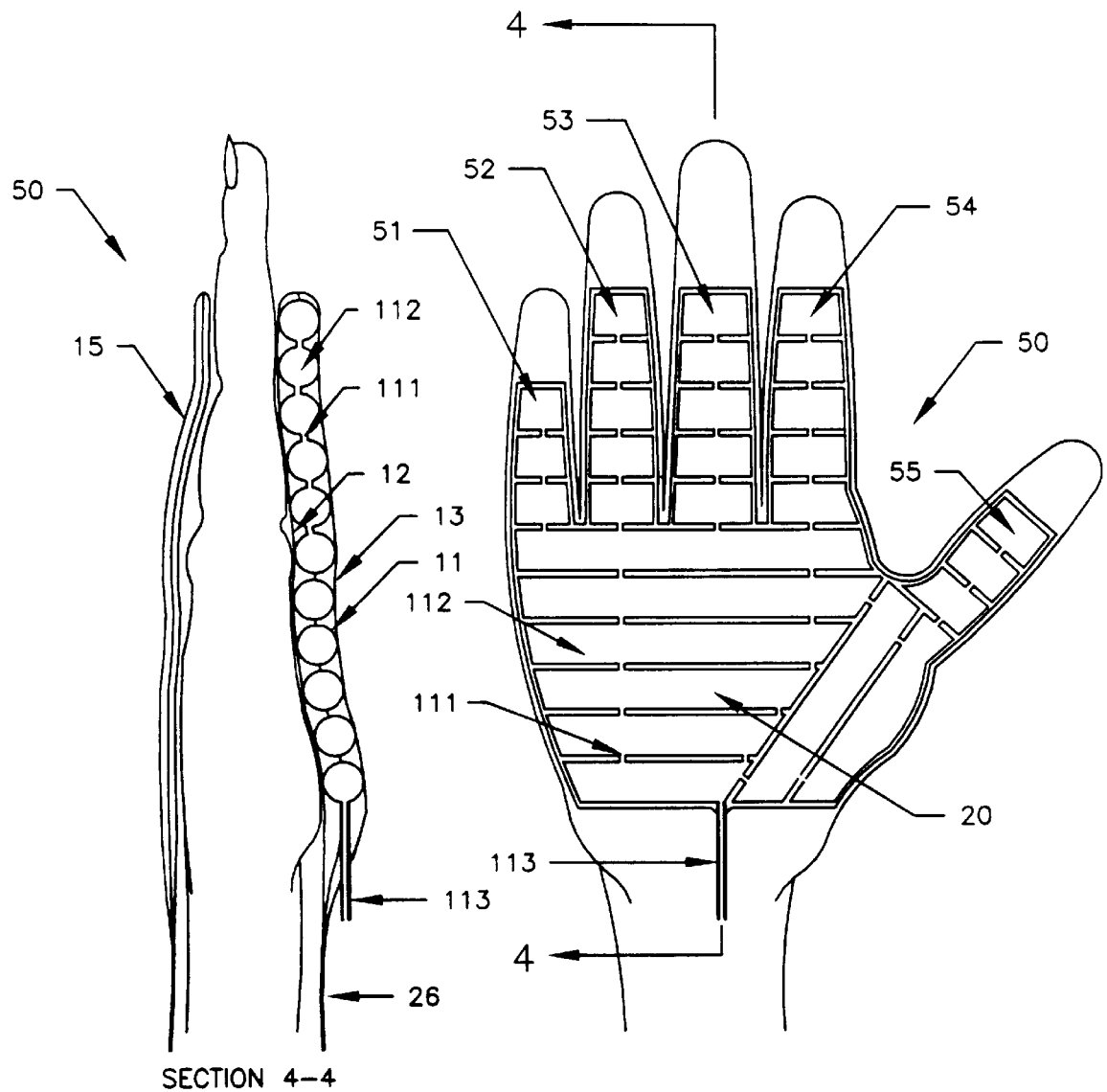

A third embodiment of the air isolation hand and handle covering is shown in FIG. 4. Glove 50 consists of a palm portion 20, finger stalls 51, 52, 53 and 54, a thumb stall 55, and a gauntlet 26. The construction of the third embodiment of the present invention is the same as the first embodiment of the present invention with the exception the finger stalls 21, 22, 23 and 24 and the thumb stall 25 are shortened and left open so that the fingers and thumb can extend exposed through the ends of the finger stalls 51, 52, 53 and 54 and the thumb stall 55.

Figures 1, 2, 5:
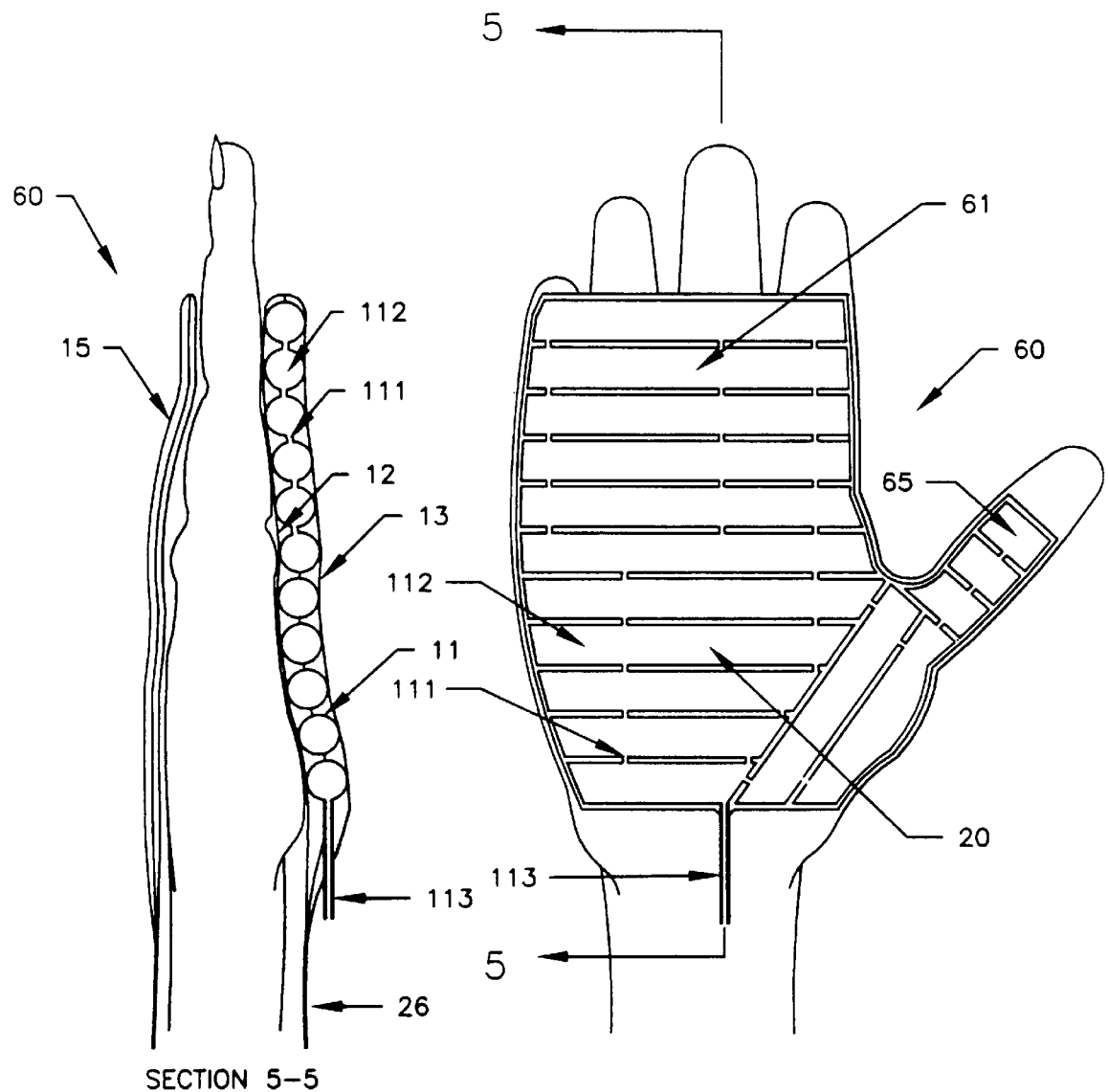

A fourth embodiment of the air isolation hand and handle covering is shown in FIG. 5, Mitten 60 that consists of a palm portion 20, a finger portion 61, a thumb stall 65, and a gauntlet 26. The construction of the forth embodiment of the present invention is the same as the second embodiment of the present invention with the exception the finger portion 42 and the thumb stall 25 are shortened and left open so that the fingers and thumb can extend exposed through the ends of the finger portion 61 and the thumb stall 65.

Figures 1, 8:
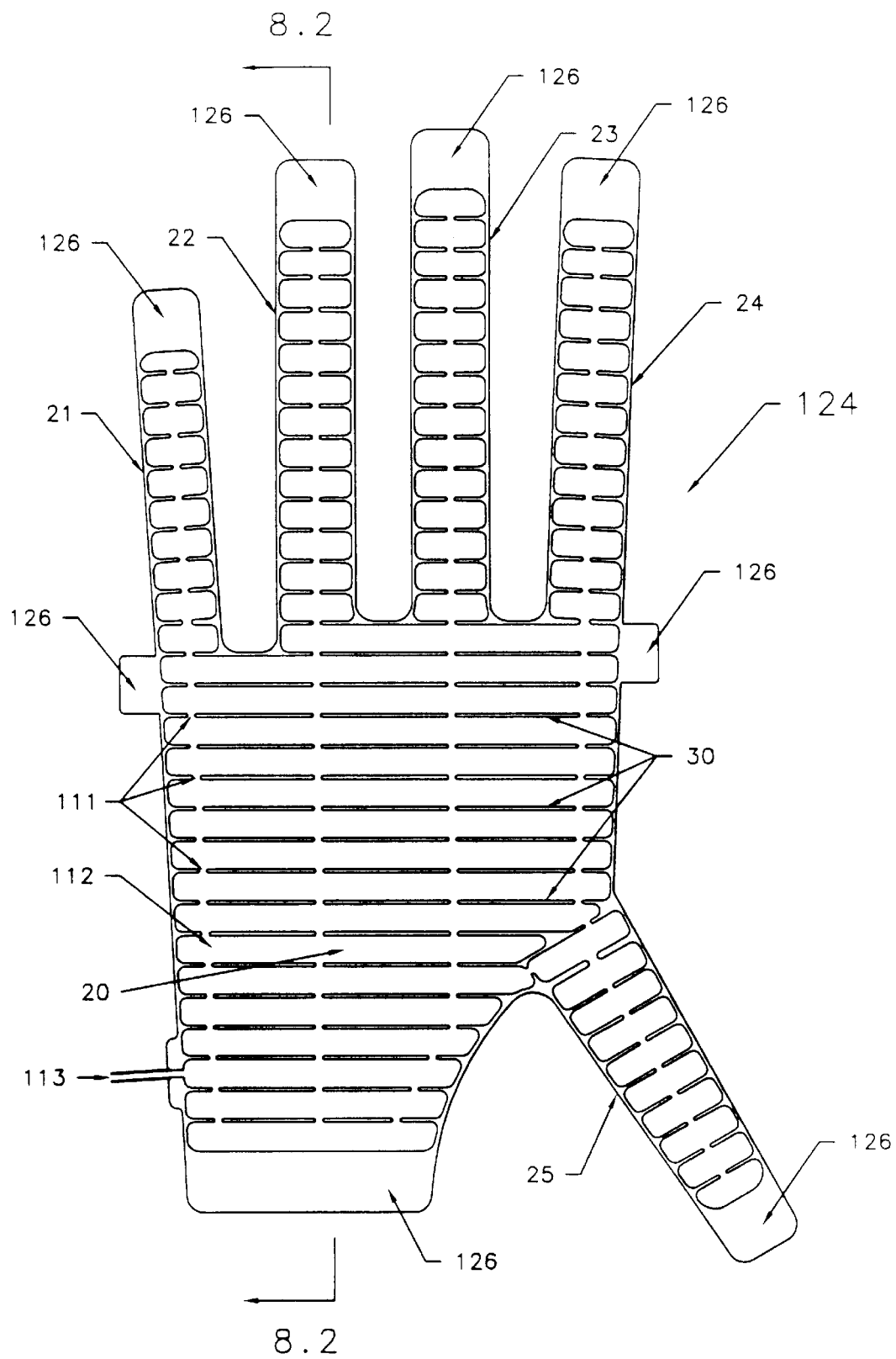
Figures 2, 8:
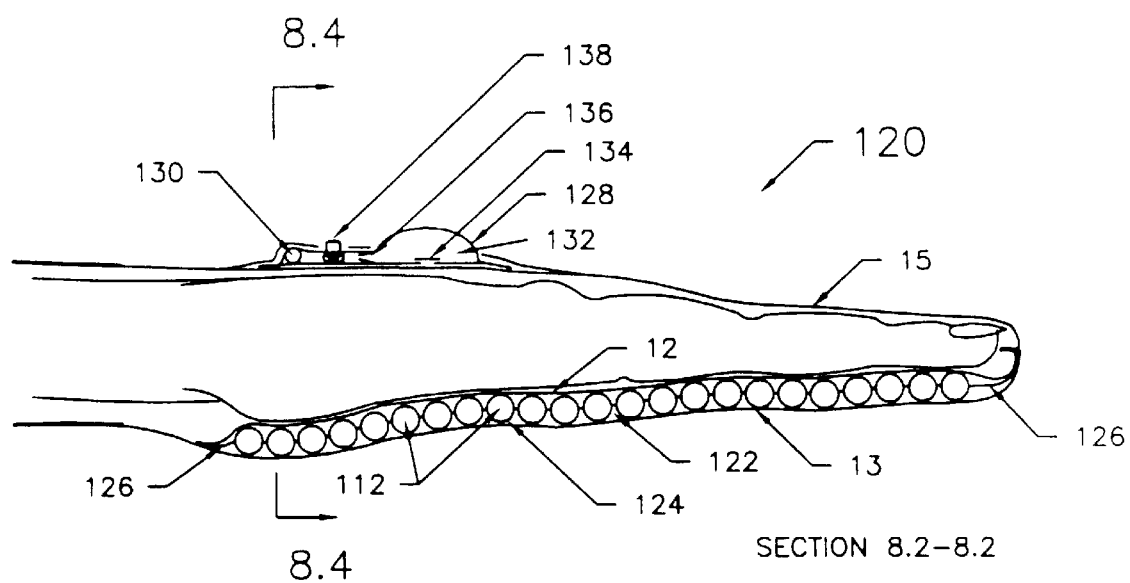
Figures 3, 8:
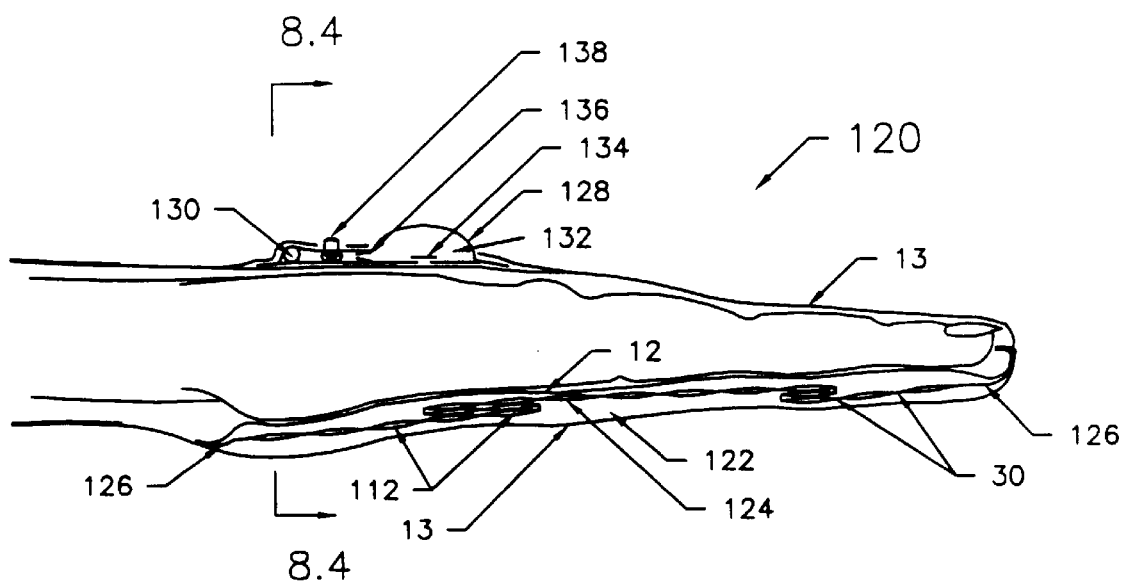
Figures 4, 8:
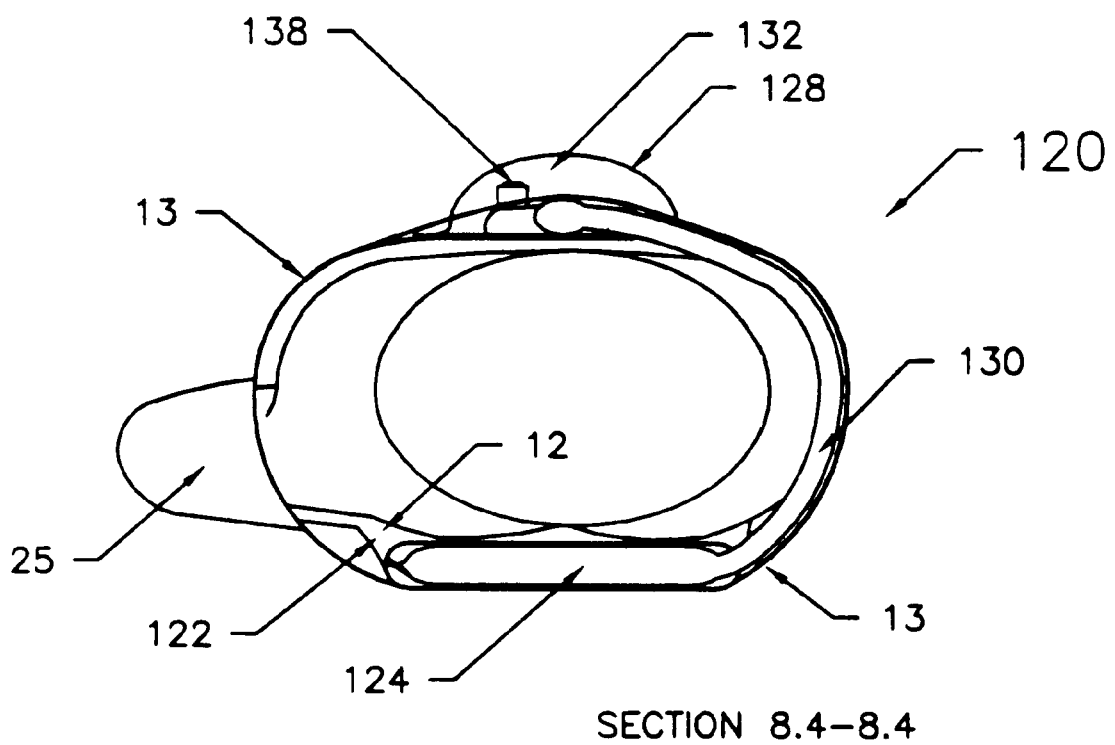
Figures 5, 8:
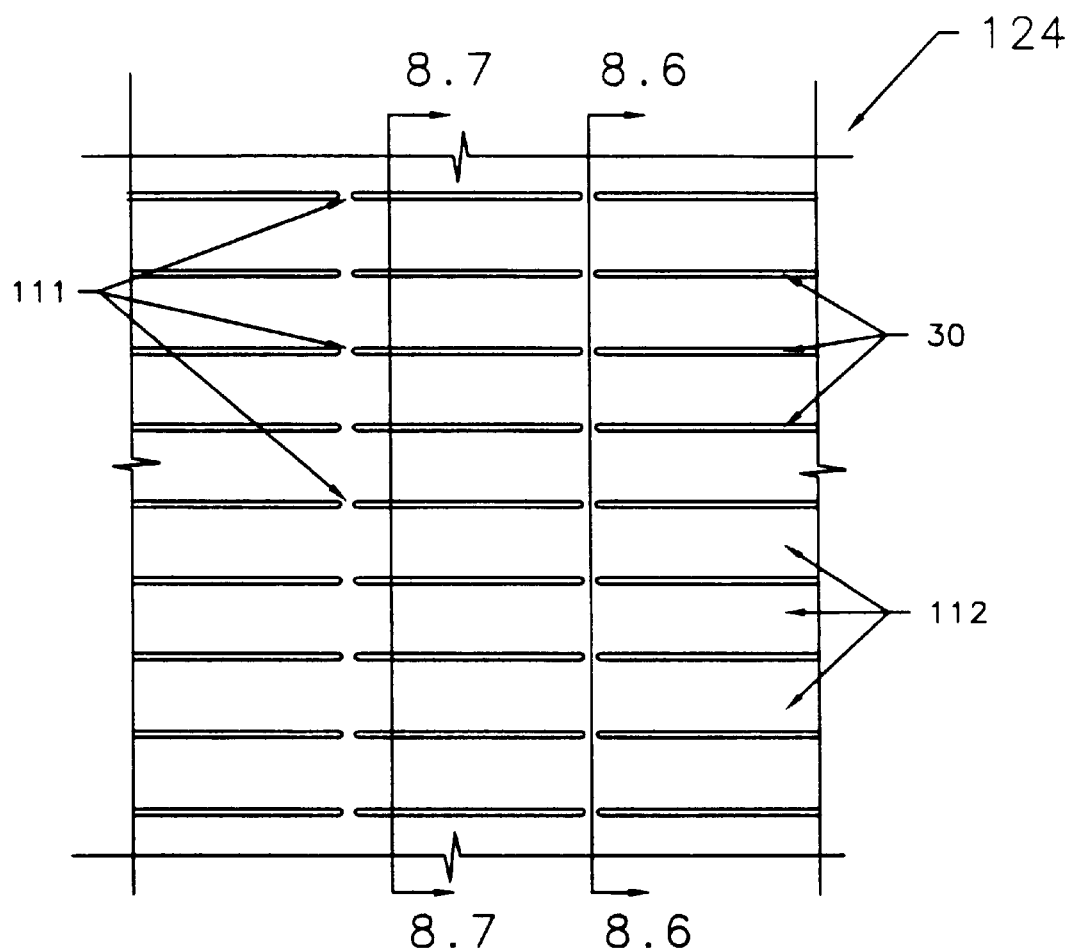
Figures 7, 8:
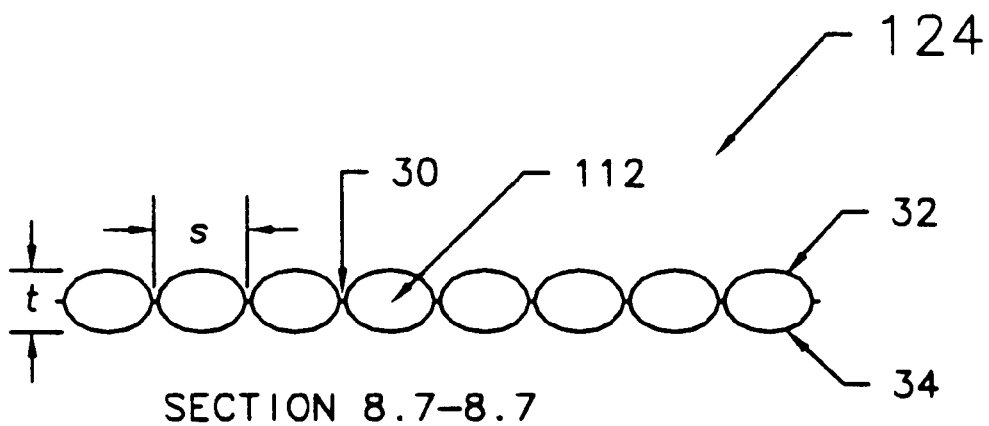
Figures 6, 8:
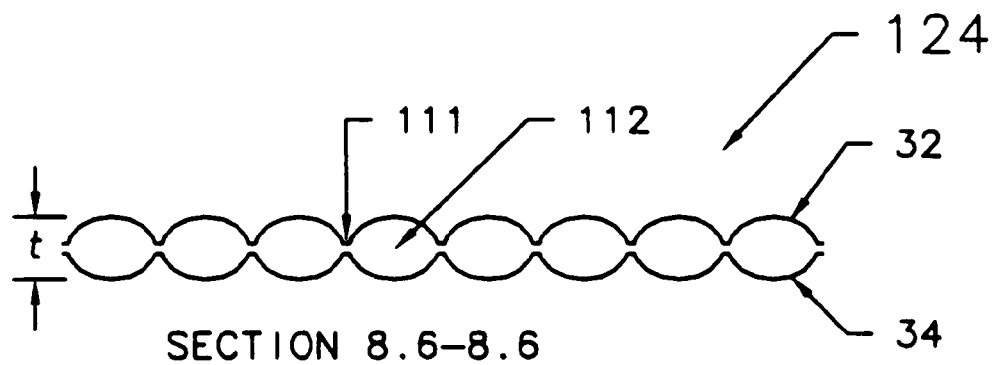
Figure 8:
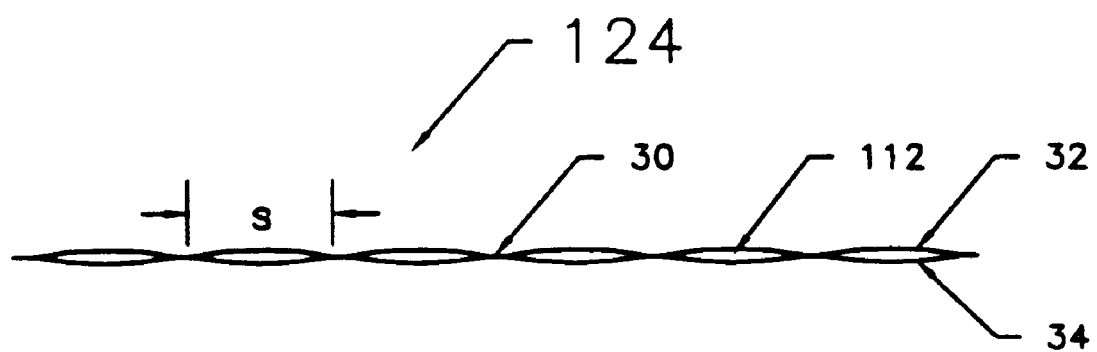

A fifth embodiment of the air isolation hand and tool handle covering is shown in FIG. 6. Mitten 70 consists of a palm portion 20, a finger portion 42, a thumb stall 25, and a gauntlet 26. The construction of the fifth embodiment of the present invention is the same as the second embodiment of the present invention with the following exception. Lubricating strips 72 can be attached to the palm portion 20 and the finger portion 42 of the mitten. Lubricating strips 72 may be thin solid strips of teflon or other like material.

Lubricating strips 72 allow mitten 70 to slide relative to a vibrating hand-held object, such that the only vibrating forces which are substantially transmitted to mitten 70 are those normal to the grasping surface. Vibratory shear forces are not substantially transmitted to mitten 70, thus increasing the effectiveness of mitten 70. This embodiment is particularly useful for applications where the hands are used primarily to push a vibrating object that has substantial vibration motion tangent to the palm and finger surfaces of the mitten.

Figure 7:
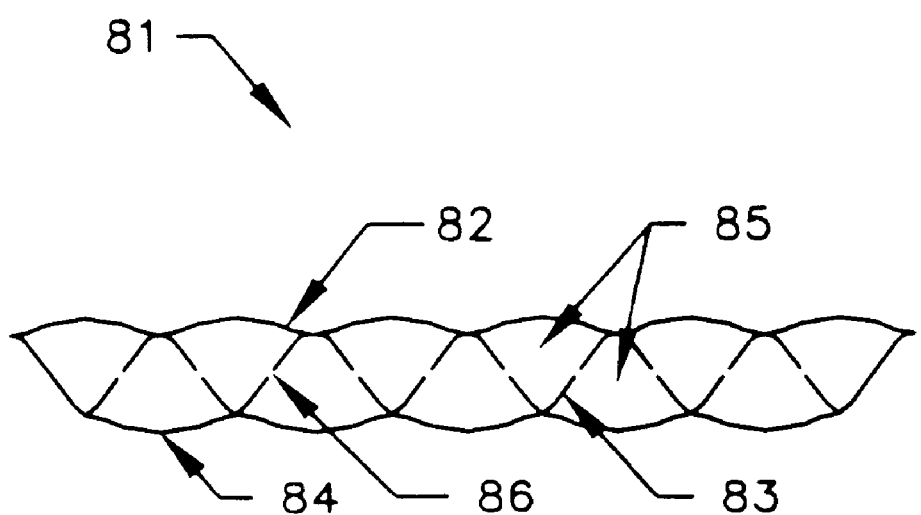
FIG. 7 is a cross-sectional view of a three-layer air bladder configuration with two adjacent rows of air cells.

The air bladders 11 in the five embodiments of the present invention shown in FIGS. 2-6 are composed of a single layer of air cells 112. Alternatively, as shown in FIG. 7, the air bladders 11 in the five embodiments of the present invention can include two adjacent layers of air cells 85. The air bladder 81 in FIG. 7 can be made from three layers 82, 83 and 84 of thermoplastic or other similar material that are bonded together. The three layers 82, 83 and 84 can be bonded together to form air cells 85 cross-sectional shapes that are circular, triangular, square, hexagonal, octagonal, etc. If interconnection of adjacent cells 85 is desired, small orifices in the middle layer 83 can be used to allow air cells 85 to communicate with each other.

A sixth embodiment of the invention is shown in FIGS. 8-1, 8-3, 8-4, 8-5, 8-6, 8-7 and 8-8. In this embodiment, glove 120 contains a different arrangement and construction of air bladder 124 and pump 128, but otherwise is constructed similarly to the first embodiment.

As best shown in FIGS. 8-2, 8-3 and 8-4, a pocket 122 is defined between the inner liner 12 and the outer covering layer 13, and air bladder 124 is inserted into pocket 122.

As best shown in FIG. 8-1, bladder 124 has attachment tabs 126 extending from the tips of the fingers portions 21, 22, 23 and 24. Attachment tabs 126 are also located at the sides of the palm section 20, at the base of the palm section 20, and at the tip of the thumb portion 25. Attachment tabs 126 may be stitch tabs which can be punctured without rupturing bladders, thus allowing attachment tabs 126 to be sown in to appropriate locations of the glove 120. Alternatively, attachment tabs 126 may be bond tabs which attach to appropriate location of the glove 120 by adhesive, thermal or other bonding operations. Attachment tabs 126 are used to fix the position of air bladder 124 in pocket 122.

Figures 3, 9:
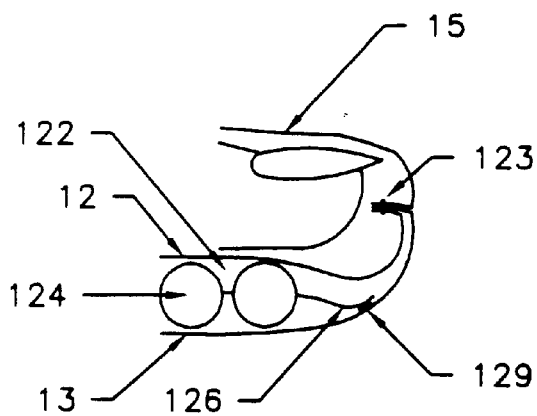
Figures 2, 9:
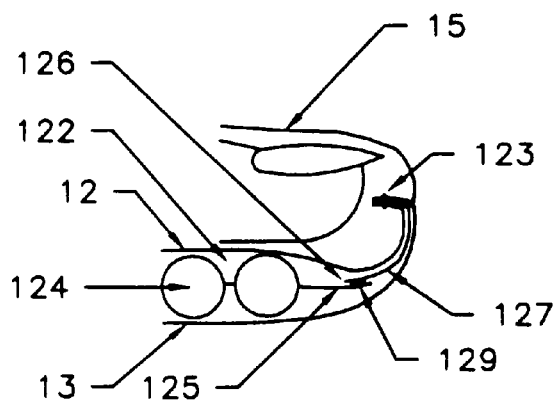
Figures 1, 9:
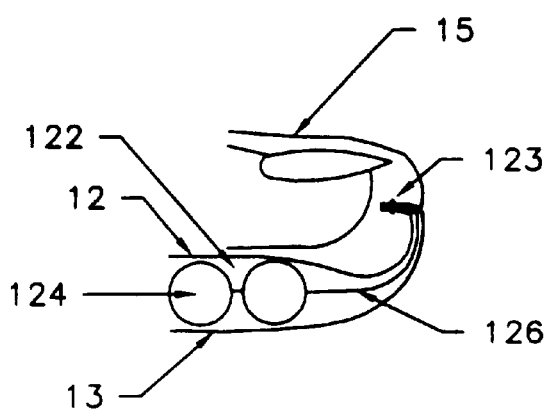

FIGS. 9-1 through 9-3 show different configurations of the attachment tabs 126. FIG. 9-1 shows the attachment tab 126 as an extension of air bladder 124 that is directly sewn or bonded into the glove seam 123. FIG. 9-2 shows the attachment tab 126 separated into two parts 125 and 127. Part 125 is an extension of air bladder 124. Part 127 is sewn or bonded into the glove seam 123. Parts 125 and 127 are bonded together with a thermo, chemical, adhesive or other bond 129. FIG. 9-3 shows the attachment tab 126 as an extension of air bladder 124 that is directly bonded to the bladder side of the outer covering 13 by a thermo, chemical, adhesive or other bond 129. The attachment tab 126 is FIG. 9-3 may also be attached to the bladder side of the inner liner 12.

In contrast to positioning the pump on the gauntlet as in embodiments one through five, the pump 128 of the sixth embodiment is positioned on the back side 15 of glove 120. Pump 128 is connected to the small hollow tube inlet 113 of air bladder 124 by inflation line or hose 130. Hose 130 is preferably placed around either the radial or ulnar side of the wrist at the base of the palm section 20. Hose 130 should be constructed sturdily enough that it does not crimp or close even upon use of glove 120.

Pump 128 consists of an inflation bulb 132, an inflation valve 134 for the pump to maintain pressure while inflating bladder 124, and a check valve 136 so bladder 124 can maintain pressure after inflation. A pressure relief valve 138 opens hose 130 to the atmosphere so the air in bladder 124 can be released when desired.

In contrast to the upward orientation of thumb section as in embodiments one through five, the thumb section 25 of the bladder 124 of the sixth embodiment is angled downward away from the finger sections 21, 22, 23 and 24. Depending on the construction of the glove 120, this downward orientation of thumb section 25 assists in attaching bladder 124 within the glove 120. In cases where glove 120 will be primarily used to hold a bar or handle between the thumb and fingers by opposable flexing of the thumb, the downward orientation of thumb section 25 may also assist in placing bladder 124 over the side of the thumb which makes contact with the bar or handle.

In the preferred configuration of this sixth embodiment and as best seen in FIGS. 8-6 and 8-7, the cross-sectional thickness of the air bladder cavities 120 in the palm portion 20 and the finger and thumb stalls 21, 22, 23, 24 and 25 have a uniform thickness t. The size of this thickness t is controlled by the spacing of cell divisions 30. However, this spacing between cell divisions 30 changes upon inflation of the glove. FIGS. 8-7 and 8-8 demonstrate the change in cell division spacing between the inflated state shown in FIG. 8-7 and the deflated state shown in FIG. 8-8. To provide an inflated bladder thickness t within the range of 0.12 in. (3 mm) to 0.38 in. (9.7 mm), the deflated weld location spacing s shown in FIG. 8-8 is chosen between 0.23 in. (5.9 mm) and 0.7 in. (17.7 mm). This corresponds to an inflated weld location spacing s shown in FIG. 8-7 from 0.22 in. (5.5 mm) to 0.6 in. (15.2 mm). The difference between the inflated weld location spacing and the deflated weld location spacing is due to the curvature of the inner layer 32 and outer layer 34 upon inflation. Bladder 124 is generally inelastic, and the surface area of the material of bladder 124 remains constant between inflation and deflation, but the curvature of inner layer 32 and outer layer 34 upon inflation causes weld location spacing to decrease. As a result, the overall surface area of bladder 124, relative to the deflated state, decreases when the bladder is inflated.

The thickness of air bladder 124, inflated to the proper inflation pressure, determines the effectiveness of the bladder in attenuating the transmission of vibration or shock energy into the palm and fingers of the hand. Generally speaking, the thicker the air bladder the more effective it is in attenuating vibration or shock energy.

The air bladder 124 is preferably design to have a thickness t within the range from 0.12 in. (3 mm) to 0.38 in. (10 mm). Testing has indicated that the bladder 124 with a thickness of 0.12 in. (3 mm) is the minimum bladder thickness necessary to sufficiently attenuate vibration to meet the requirements specified in European Standard prEN ISO 10819 for a glove to be labeled as an antivibration glove. FIG. 1-1 indicates the results of such testing. The maximum thickness of the air bladder is primarily constrained by ergonomic, strength and carpal tunnel considerations. The glove 120 of the present invention is designed for clasping handles or grips, and the Radwin effect limits the permissible thickness of the bladder 124. The Radwin effect denotes that the forearm strength required to clasp a handle with a constant grip force increases as the diameter of the handle increases. As the forearm strength required to clasp a handle increases, the tonic reflex results in a corresponding increase in the intracompartmental pressure in the carpal tunnel. Increased intra-compartmental pressure in the carpal tunnel increases the potential for developing carpal tunnel syndrome. Typical tool handles have an effective diameter that ranges from 0.75 in. (19.1 mm) to 1.6 in. (40.6 mm). The placing of an air bladder in a glove between the tool handle and the hand increases the effective diameter of the tool handle. Along with increasing the potential for developing carpal tunnel syndrome, increasing the effective diameter of a tool handle can also have a negative effect on being able to properly control a vibrating tool or a tool exposed to shock during its intended use. Taking these factors into consideration, the maximum overall thickness of air bladder 124 is 0.38 in. (9.7 mm), while the preferred overall thickness of air bladder 124 is 0.17 in. (4.3 mm). The measured medium and high frequency vibration transmissibility values for this preferred 0.17 inch (4.3 mm) bladder are shown in FIG. 1-2. FIG. 1-2 indicates that for bladder 124 to simultaneously meet the requirements of EN/ISO 10819 (1995) for both values of $TR_M$ and $TR_H$, the thickness of the bladder material should be less than 0.008 inches.

The design of glove 120 provides several advantages. A major advantage is due to the use of attachment tabs 126. As discussed earlier, the spacing s between weld locations 30 becomes smaller upon inflation of bladder 124. The length of the bladder 124 from the base of palm section 20 to the tips of finger stalls 21, 22, 23 and 24 includes numerous inflation cells 30, and decreases proportionally upon inflation. For instance, the inflated bladder 124 may have a length which is approximately 85 to 90% of the length of the uninflated bladder. The glove 120 is generally constructed with an uninflated bladder 124, and attachment tabs 126 provide identifiable benchmarks in construction of the glove 120. That is, attachment tabs 126 may be attached to inner layer 32 and outer layer 34 at locations which correspond with the inflated length of bladder 124. This causes some bunching of bladder 124 while uninflated, but provides an inflated glove 120 where the areal size of bladder 124 matches the areal size of inner layer 32 and outer layer 34. The bunching may be avoided by folding several of the uninflated inflation cells 112 over on themselves, as shown in FIG. 8-3.

Placement of pump 128 and pressure relief valve 138 on the back side 15 of glove 120 provides several advantages. First, gauntlet 26 no longer contains a pump or pressure relief valve, and can be made smaller and more comfortable. Second, back side 15 is generally more accessible while using the glove and during grasping. The air pressure can be more easily adjusted during use of the glove, allowing the air pressure to be felt and monitored by the user in actual working conditions during adjustment. Also, the air pressure can be easily adjusted, either with the free hand or by a different person, without halting work by the hand using the glove. Thirdly, grasping with the glove 120 will draw back side 15 taut against the back of the user's hand, firmly seating pump 128 against the relatively hard, flat surface. In this position, pump 128 can be used simply by pressing on inflation bulb 132, without any need to hold or otherwise support inflation bulb 132 with the pumping hand.

Air bladder 150 shown in FIGS. 10-1, 10-2, 10-3, 10-4, 10-5 and 10-6 represents a seventh embodiment of the invention. In many respects the seventh embodiment is identical to the sixth embodiment. However, the weld locations of bladder 150 are markedly different from those of bladder 124. Bladder 150 has weld locations 152 arranged in a square grid pattern, with uniform spacing s between weld locations. The weld points 152 can be round, square, triangular, or any other geometric shape. Cell divisions 30 are provided at intervals on the bladder 150 through line bonding or welding between the inner layer 32 and outer layer 34. Line bonds 30 enhance the flexibility and dexterity associated with the use of bladder 150.

The grid pattern of weld locations 152 provides additional advantages in the manufacture and use of bladder 150. The change in spacing between weld locations 152 occurs in width as well as in length. This helps avoid curling problems associated with inflating bladders having linear cells. The absence of curling helps retain a closer feel between bladder 150 and inner liner 12 and outer covering layer 13 during inflation of the bladder 150. Additionally, line bonds 30 can be placed as desired on bladder 150 without affecting the thickness of any portion of inflated bladder 150. This allows bladder 150 to have several relatively planar portions connected by separations or joints at locations selected by the designer to correspond with the desired flexing of bladder 150, without affecting the uniform thickness of bladder 150. To provide an inflated bladder thickness t from 0.12 in. (3 mm) to 0.38 in. (9.7 mm), the deflated weld location spacing s is chosen from a range of 0.18 in. (4.5 mm) to 0.5 in. (12.7 mm). This corresponds to a inflated weld location spacing s shown in FIG. 10-4 of 0.16 in. (4.1 mm) to 0.41 in. (10.4 mm).

Air bladder 160 shown in FIGS. 11-1, 11-2, 11-3 and 11-4 represents an eighth embodiment of the invention. In many respects the eighth embodiment is identical to the seventh embodiment. However, the weld locations 162 of this embodiment are in the shape of plus signs (+). This provides a grid of rectangular inflation cells 164 interconnected on each side to adjacent inflation cells 164. With square inflation cells 164 shown in FIGS. 11-1 and 11-2, shrinkage during inflation occurs equally in both directions, helping to avoid the curling problems noted earlier. To provide an inflated bladder thickness t from 0.12 in. (3 mm) to 0.38 in. (9.7 mm), the deflated weld location spacing is chosen between 0.18 in. (4.5 mm) to 0.5 in (12.7 mm). This corresponds to a inflated weld location spacing s shown in FIGS. 11-3 and 11-4 of 0.16 in. (4.1 mm) and 0.41 in. (10.4 mm).

Workers skilled in the art will appreciate that other regular or irregular grid patterns may be beneficial. For instance, a triangular grid pattern may be used. As a second example, a hexagonal honeycomb grid pattern arrangement may be used to provide a bladder without any linear arrangement of weld locations between cells, thus making the bladder less subject to folding or flexing. Finally, other non-grid patterns may be used to facilitated flexing in desired locations, such as with the palm lines of a user's hand. In non-grid configurations, the designer may still wish to equalize distances between weld locations to provide a bladder having a uniform thickness.

Figure 12:
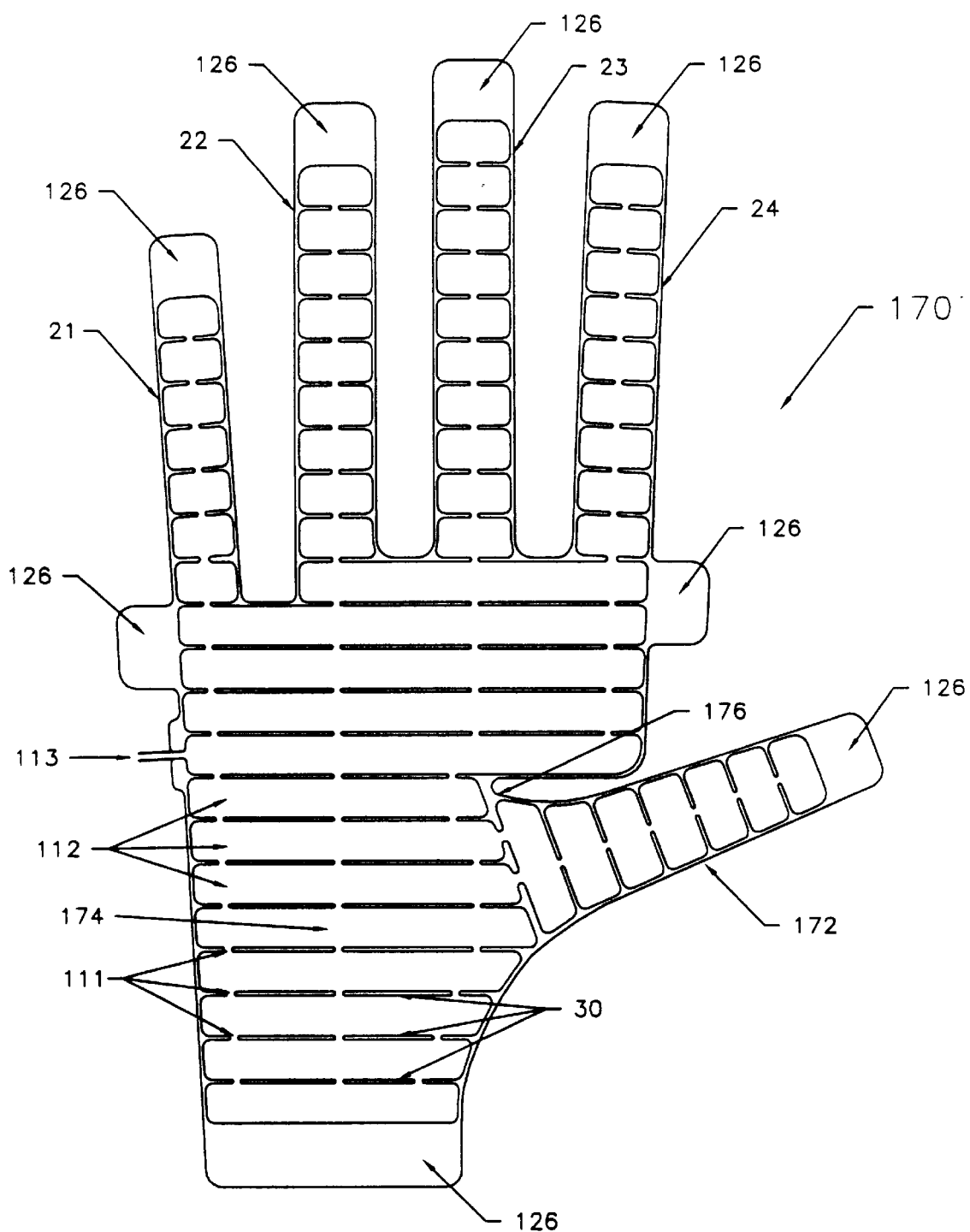
FIG. 12 is a plan view of a ninth embodiment of a bladder for the air isolation hand covering of the present invention.
Figure 13:
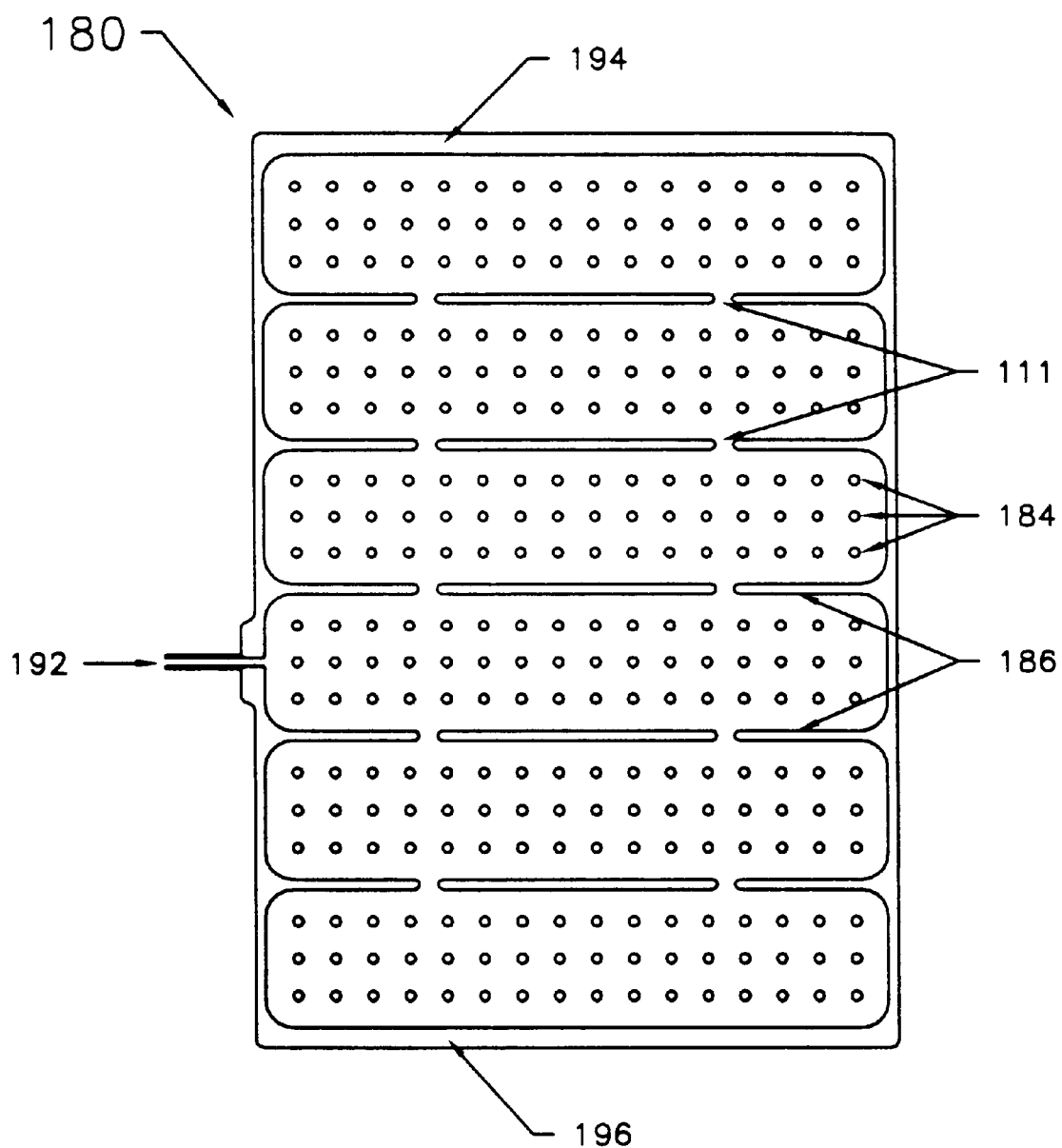
FIG. 13 is a plan view of a bladder for use in a handle covering of the present invention.

Air bladder 170 shown in FIG. 12 represents a ninth embodiment of the invention. In many respects the ninth embodiment is identical to the sixth embodiment. However, thumb section 172 of air bladder 170 is angled upward rather than downward. Additionally thumb section 172 is recessed into palm portion 174. As shown, the base 176 of thumb section 172 lines up with the middle finger 23 rather than the first finger 24. This allows grasping with bladder 170 with the thumb in an orientation closer to the middle finger, while continuing to maintain complete separation between the user's hand and the tool handle due to bladder 170.

Air bladders 180, 280 and 310 in FIGS. 13 through 22 represent tenth, eleventh and twelfth embodiments of the invention. FIGS. 13 through 22 show air bladders 180, 280 and 310 which can be wrapped around a handle 182 or 210 of a tool or other object clasped by the hand that is exposed to vibration or shock.

Figures 1, 10:
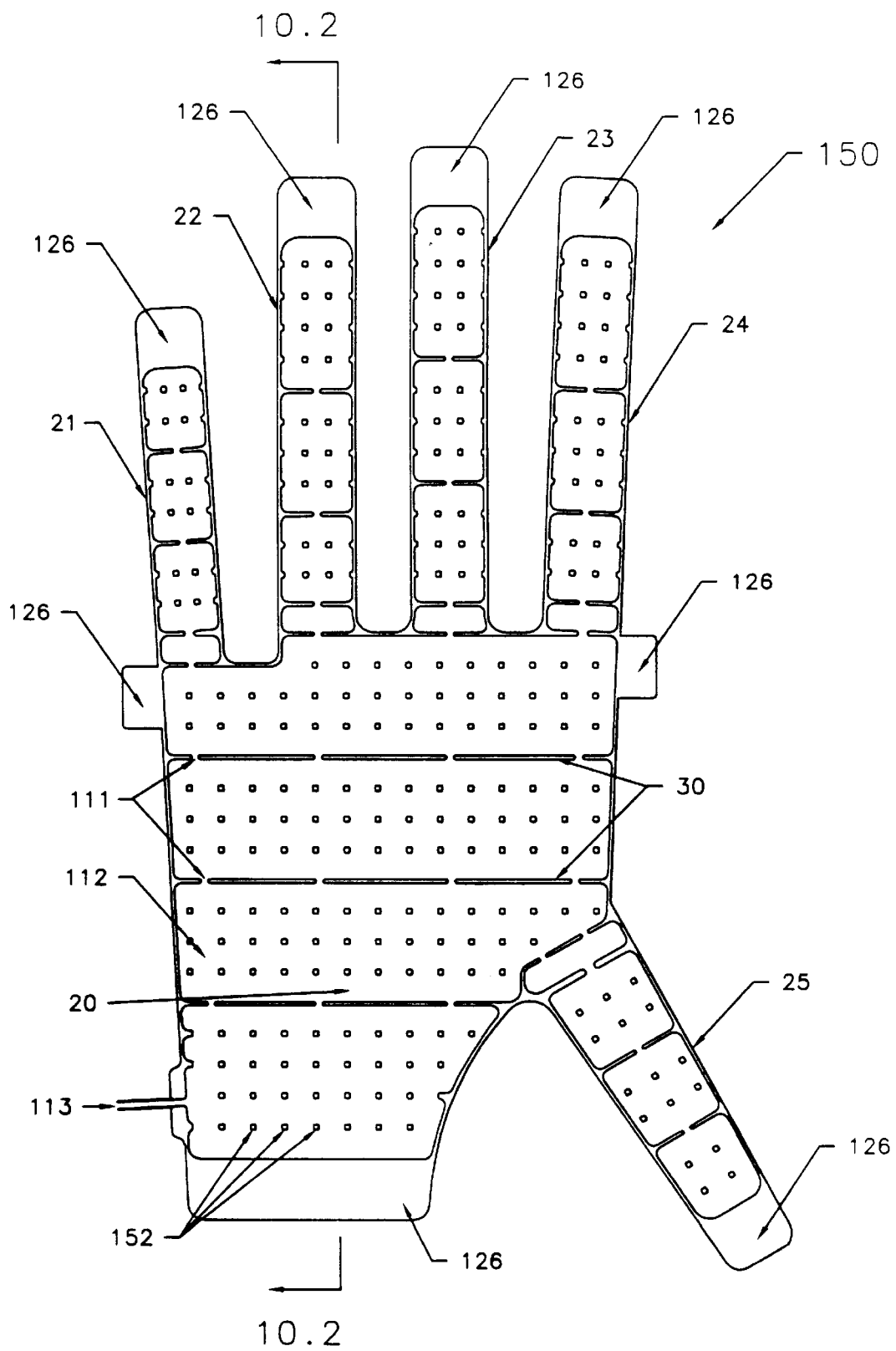
Figures 2, 10:
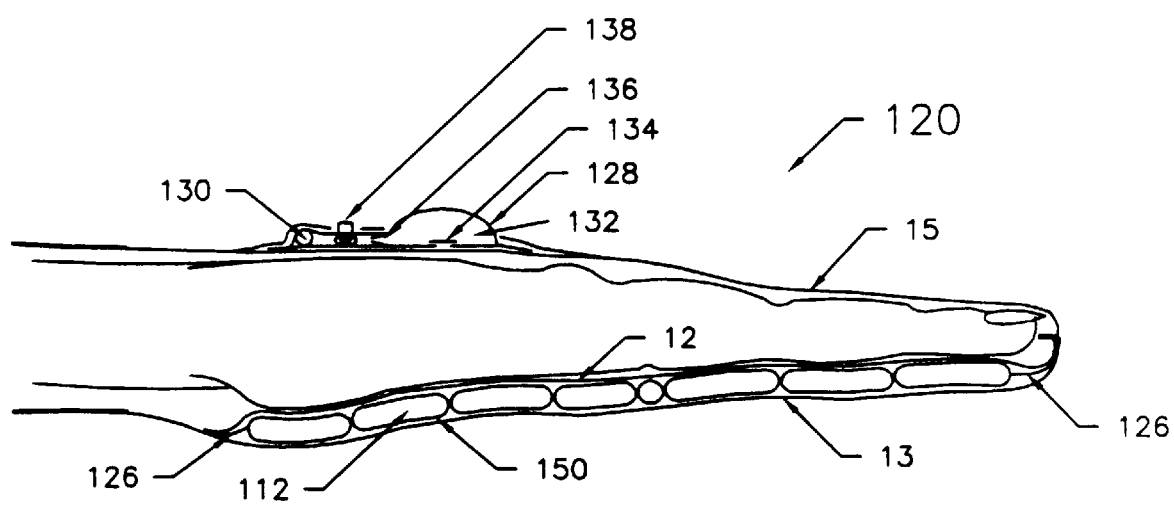
Figures 3, 10:
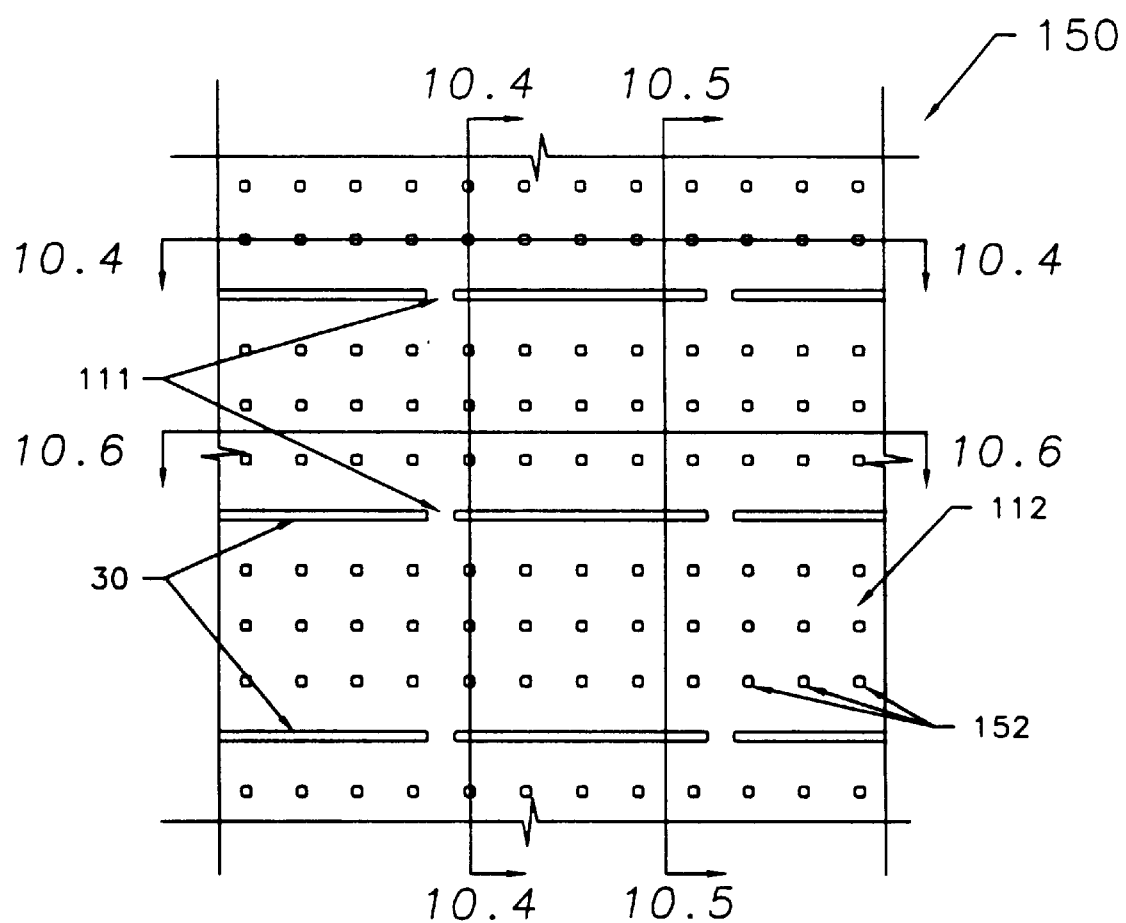
Figures 6, 10:
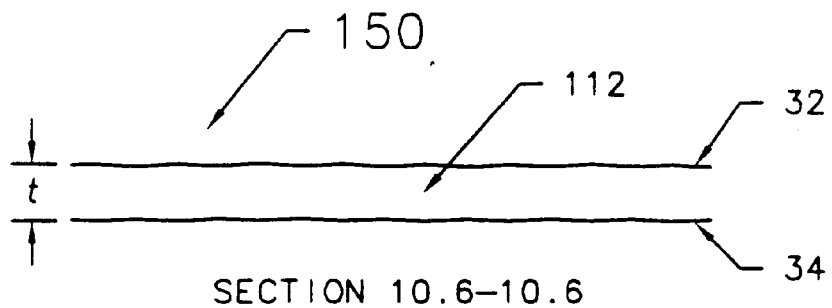
Figures 5, 10:
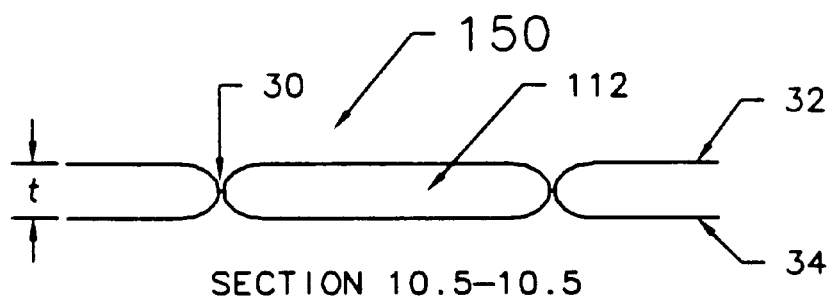
Figures 4, 10:
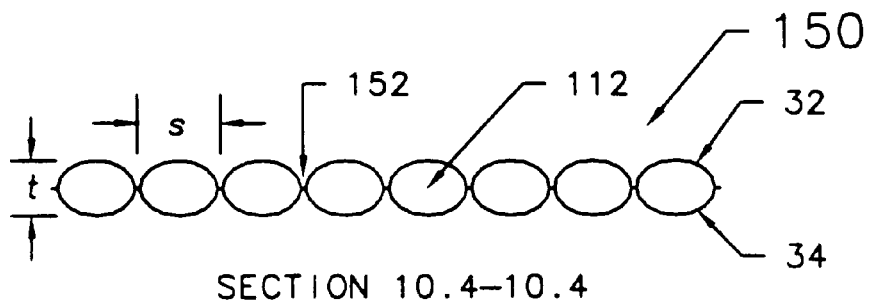

Air bladder 180 is similar in construction to the palm section 20 of the air bladder 150 shown in FIGS. 10-1 through 10-6. Bladder 180 has weld locations 184 in a square grid pattern, with uniform spacing between weld locations 184. The weld points 184 can be round, square, triangular, or any other geometric shape. Cell divisions 186 are provided at intervals on the bladder 180 through line bonding or welding between the inner layer 188 and outer layer 190. Line bonds 186 enhance the flexibility and dexterity associated with the use of bladder 180. Similar to glove embodiments discussed earlier, bladder 180 is inflated and deflated through a small hollow tube 192. Bladder 180 includes attachment strips 194 and 196 at each end for reliably attaching the bladder 180 around handle 182 or 210. The means of attachment between attachment strips 194 and 196 can be fabric hooks or buttons and associated grommets or loops, thermo or chemical welds, adhesive bonds, ties, straps, sewing, tapes or any other method of attachment. Workers skilled in the art will appreciate that these and other attachment mechanisms equivalently attach bladder 180 around handle 182.

Figures 1, 11:
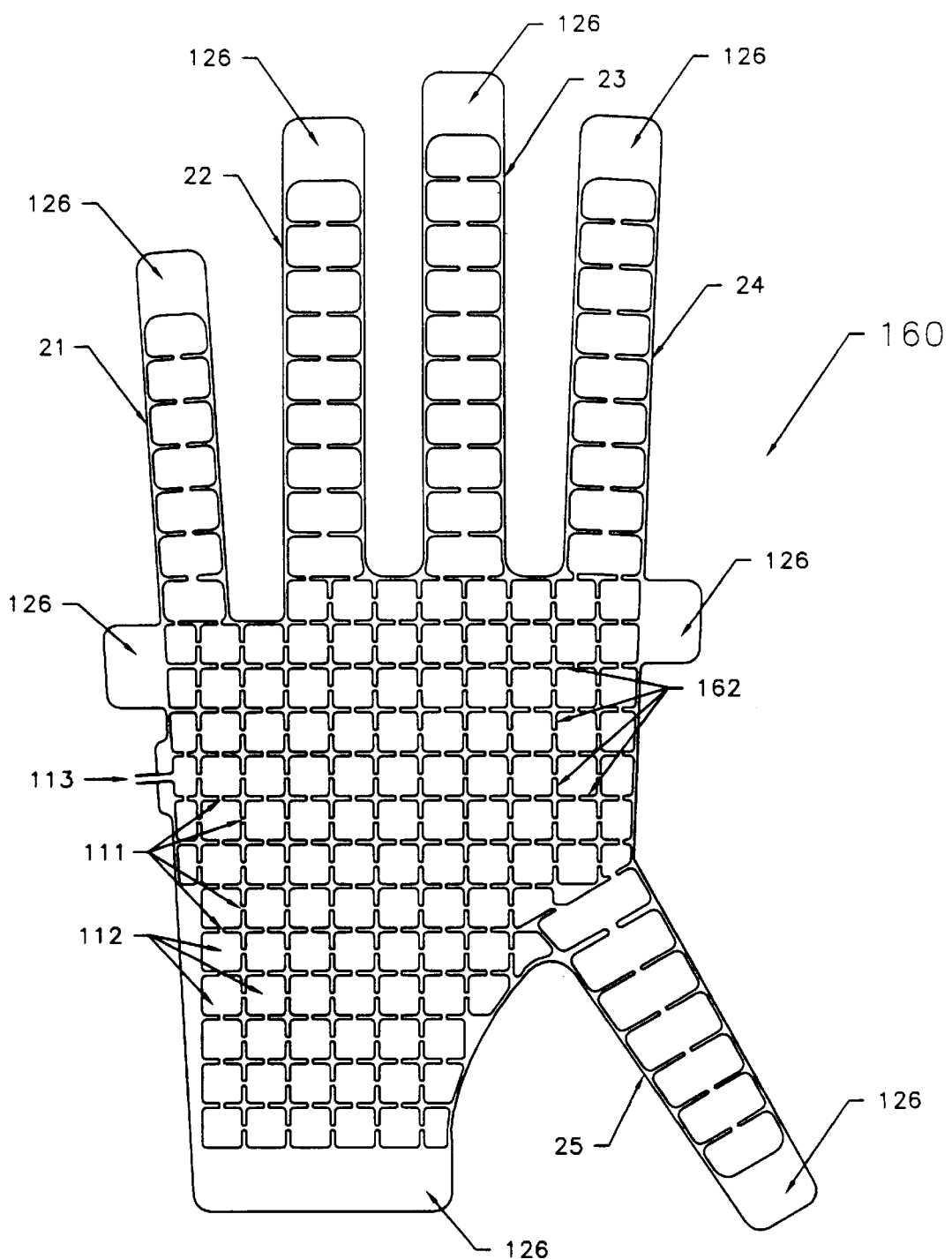
Figures 2, 11:
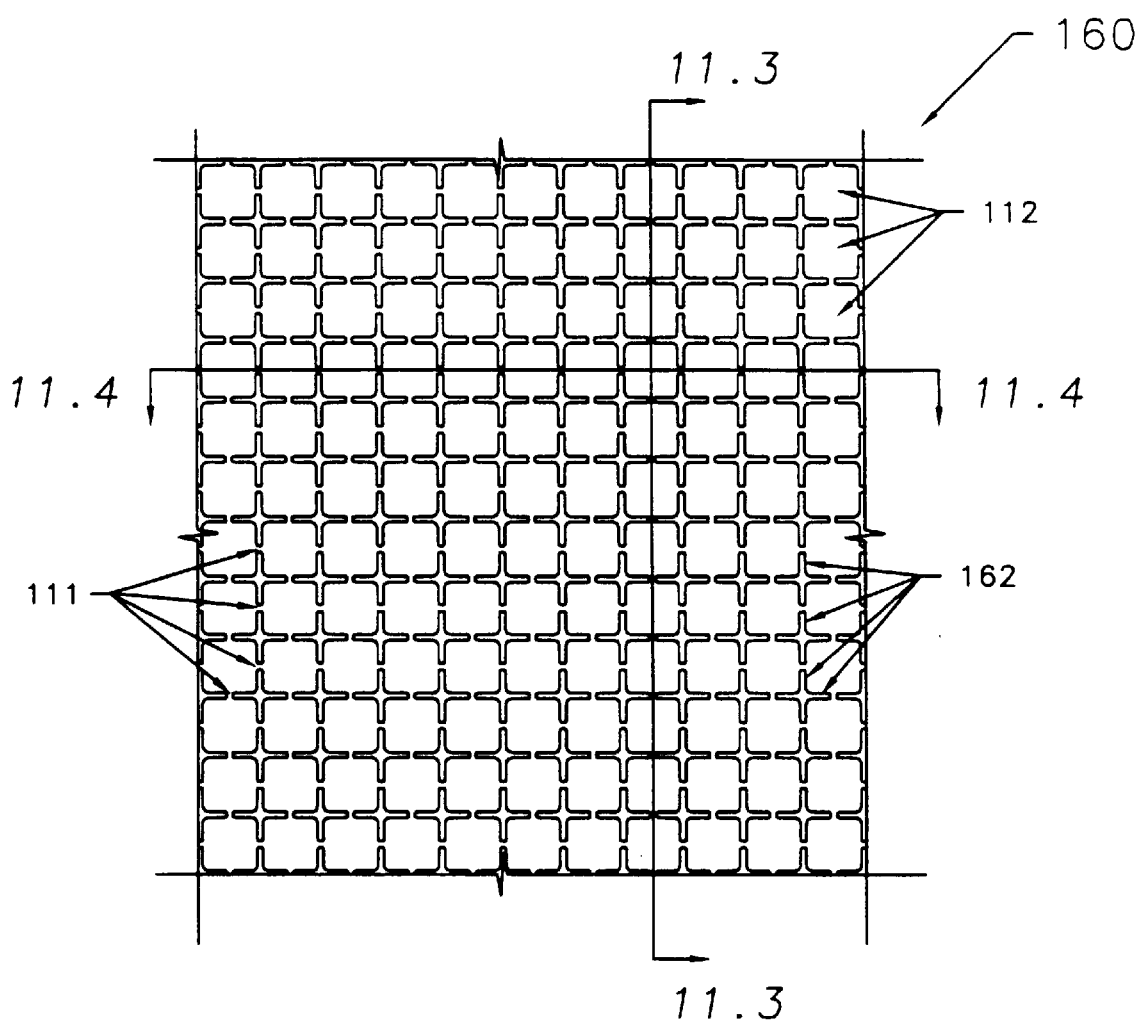
Figures 4, 11:
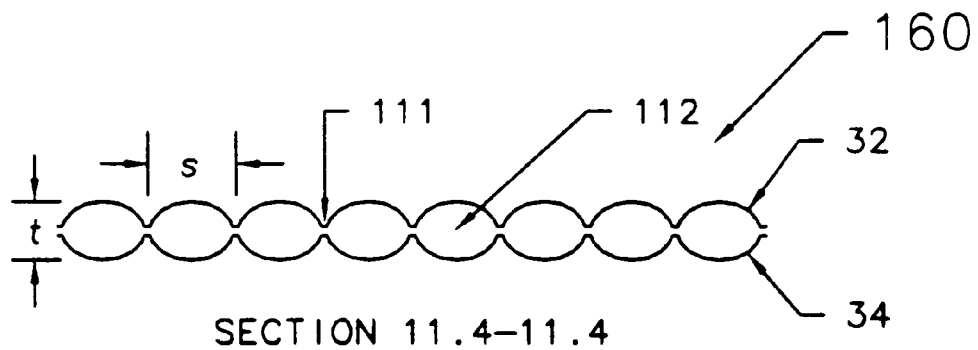
Figures 3, 11:
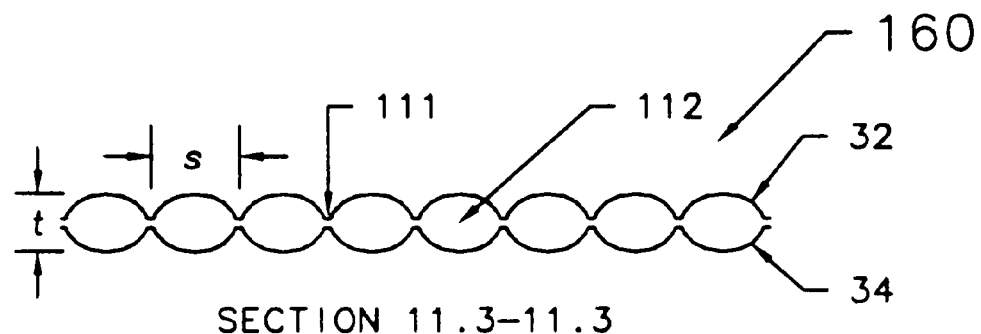

Air bladder 180 can also be similar in construction to the palm section 20 of air bladder 81 shown in FIG. 7, to the palm section 20 of air bladder 124 shown in FIGS. 8-1 through 8-8, or to the palm section 20 of air bladder 160 shown in FIGS. 11-1 through 11-4, or to any combination of cell patterns associated with air bladders 81, 124, 150 and 160. The vibration and shock energy attenuation and related design characteristics associated with this embodiment of the invention as they relate to protecting the hand from vibration and shock are the largely the same as those described for embodiments one through nine.

Figure 14:
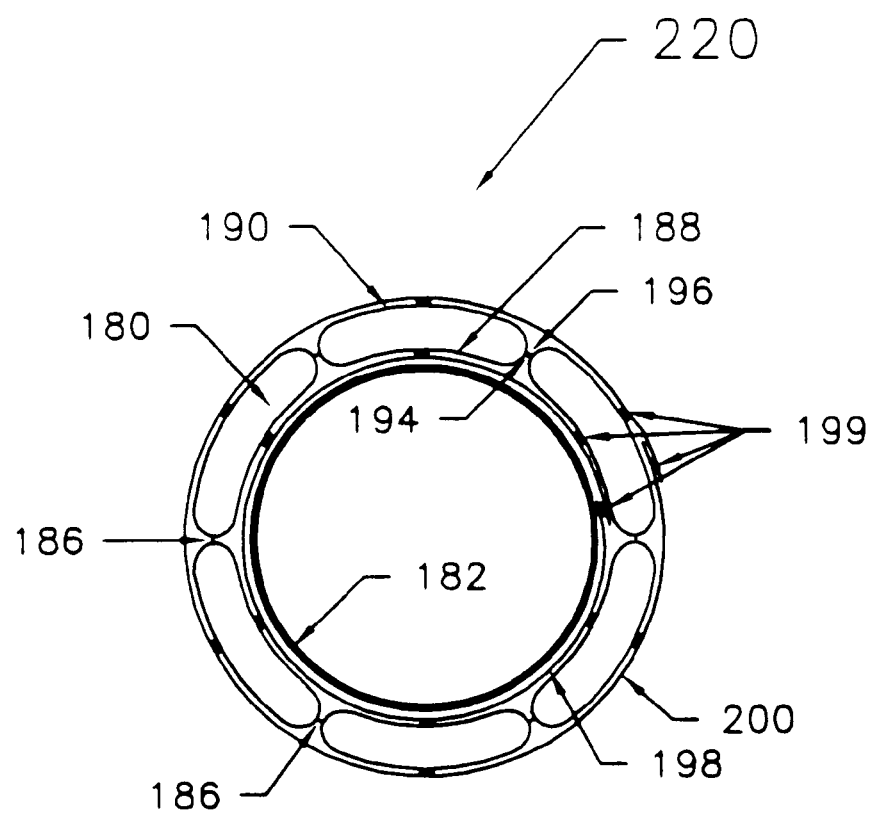
FIG. 14 is an end view of the bladder of FIG. 13 around a circular handle.

FIG. 14 shows handle covering 220 which is comprised of air bladder 180 wrapped around a round handle 182. Handle 182 can also be elliptical or any other curved shape. Air bladder 180 can be wrapped around a circular, elliptical or other curved shaped handle where the only means of attachment is the connection of attachment tabs 194 and 196 as previously described. When this means of attachment is used, a single bladder 180 can be used on several different vibrating tools, with the user moving bladder 180 from tool to tool as desired.

Situations often arise where a more substantial means of attaching air bladder 180 to handle 182 exposed to vibration or shock must be used. FIG. 14 shows how bladder 180 can be attached to handle 182 when this is the case. An inner liner 198 is wrapped around handle 182. The inner liner 198 can be attached to handle 182 by means of a tape with adhesive or other type of bonding agent on both sides of the tape or it can be bonded directly to handle 182 with an adhesive of other type of bonding agent. The inner liner 198 can be a thin layer of Latex rubber, plastic vinyl sheet, or other similar material that is used as a bonding layer for the inner layer 188 of bladder 180. The inner layer 188 of bladder 180 is bonded to the inner liner 198 by means of an adhesive or other type of bonding agent along bond or weld lines 199. The purpose of inner liner 198 is to provide a thin bonding layer to prevent bladder 180 from rotating around handle 182 while bladder 180 is clasped by the hand. The inner liner 198 can be removed and the inner layer 188 of the bladder 180 can be directly attached to handle 182 by tape with adhesive or other type of bonding agent on both sides of the tape or by other similar bonding methods. A cover layer 200 can be wrapped around the outer layer 190 of bladder 180. Cover layer 200 can be a thin layer of a variety of soft compliant materials, such as Latex rubber, plastic vinyl sheet, molded rubber, leather, elastic tape, non-elastic tape, or other similar material. The cover layer 200 can be bonded to outer layer 190 of bladder 180 by means of an adhesive or other similar material that is applied to or is part of the surface of cover layer 200 in contact with the outer layer 190 of bladder 180 or by means of an adhesive or other type of bonding agent along bond or weld lines 199. The cover layer 200 may also be a section of "shrink" tubing that is slipped over the outer layer 190 of bladder 180 and then shrunk to conform to the outer layer 190 by applying heated air to the shrink tubing. The shrink tubing may be the type that becomes rigid in its shrunken state or the type that maintains its resiliency in its shrunken state. The purpose of the cover layer 200 is to protect air bladder 180 from excessive wear or damage from objects that might come in contact with the handle. This method of attaching bladder 180 to handle 182 will allow air bladder 180 and other related elements to be easily removed from the handle when a new tool handle covering 220 must be placed around the handle.

Figure 15:
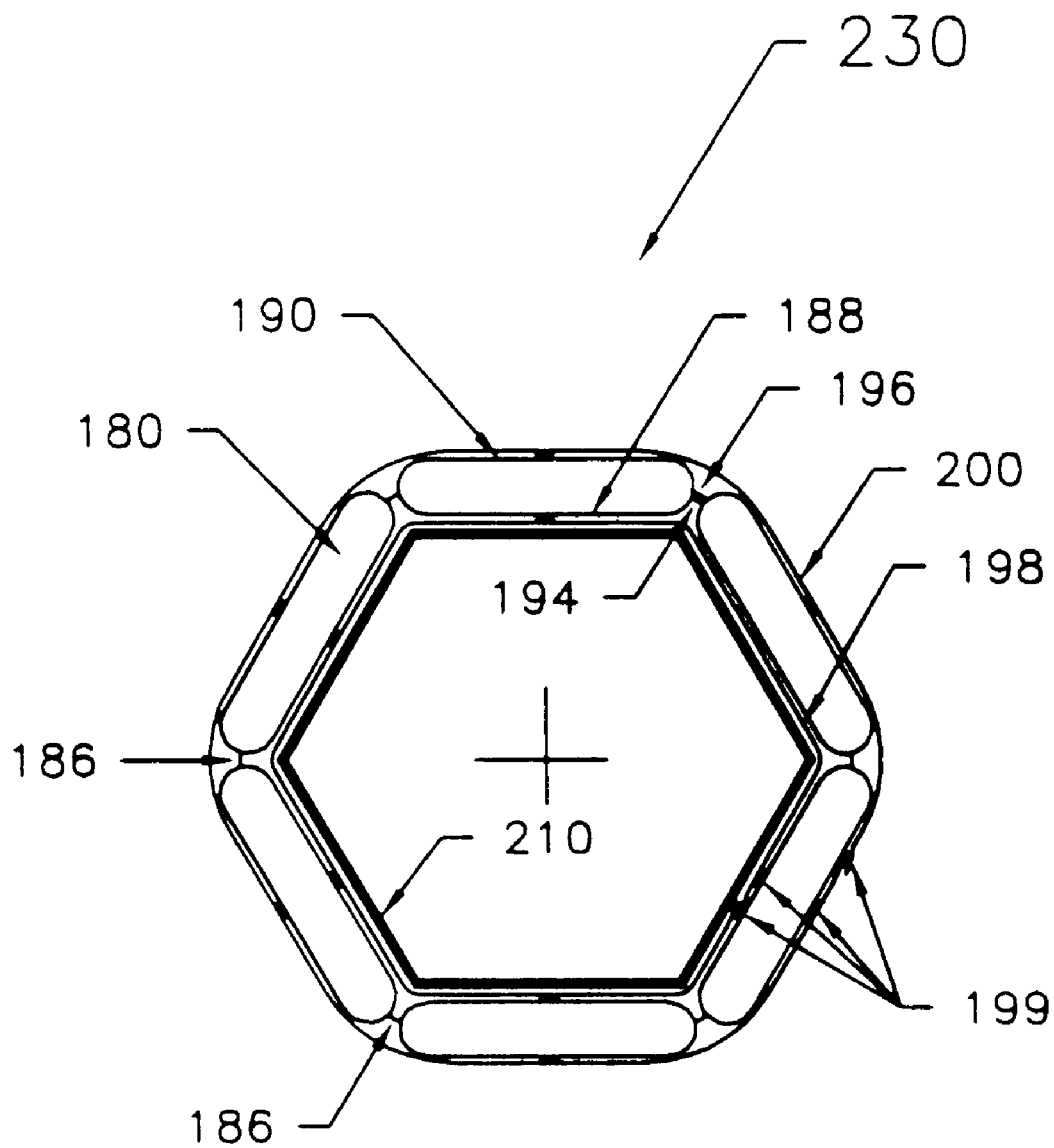
FIG. 15 is an end view of the bladder of FIG. 13 around a hexagonal handle.

FIG. 15 shows handle covering 230 which is comprised of bladder 180 wrapped around a hexagonal handle 210. Hexagonal handle 210 can be any polygonal shape. The comments made relative to attaching bladder 180 to round handle 182 also apply to attaching bladder 180 to hexagonal handle 210. Regardless of the cross-sectional shape of the handle, the flexible bladders of the present invention allow the handle coverings to be easily wrapped around the handles.

With small diameter handles, the circumference of the inside of the bladder in contact with the handle is substantially less than the circumference of the outside of the bladder in contact with the hand. If a single celled, flat (not pre-molded), flexible bladder is used, the difference in circumference causes pinching or compression of the inside surface of the bladder and stretching or tension of the outside surface of the bladder. The compression and tension forces can result in unacceptable wear in the air bladder over time and can also result in pre-mature bladder failures.

One approach to avoid the pinching and stretching caused by bending a flat-formed bladder is to have voids in the bladder that run parallel to the handle. The voids can be created by cell divisions or weld lines, particularly if the weld lines are fairly wide. The voids allow bending of the bladder without the buildup of compression and tension forces. However, the voids can allow contact between the handle and the hand which will significantly reduce the effectiveness of the bladder in reducing vibration transmitted from the bladder to the hand.

It is often preferred to use thick bladders around small-diameter handles, such that the Wear problems are exacerbated by the bending of the thick elastomer pad (formed in a flat condition) into place around a small diameter tool handle.

Figures 1, 16:
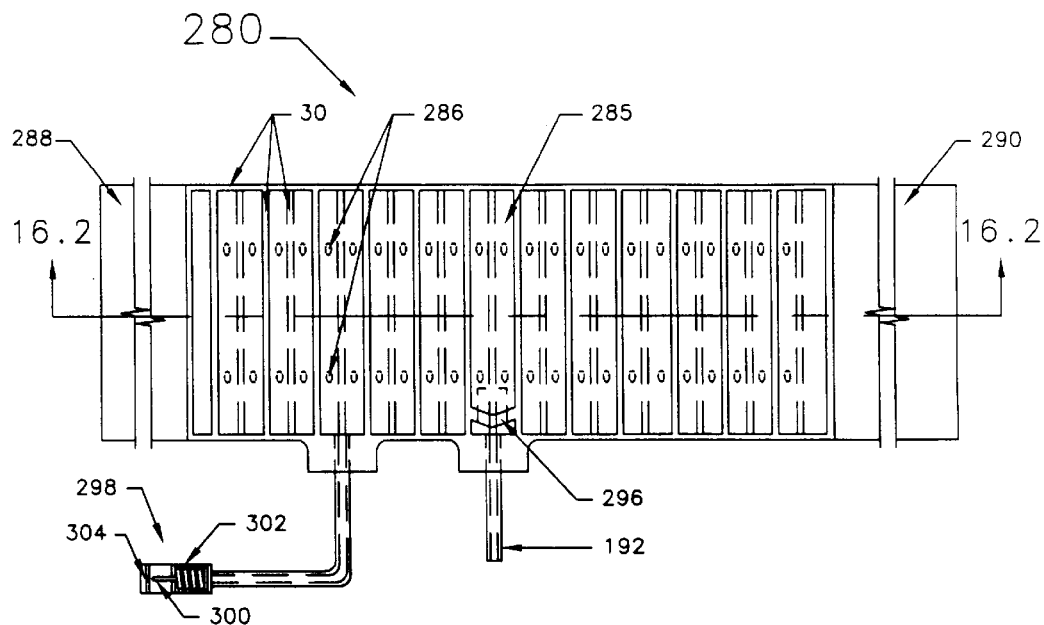
Figures 2, 16:
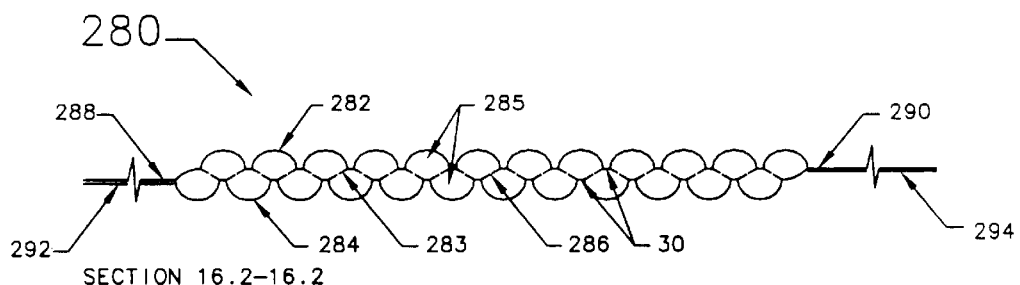
Figure 17:
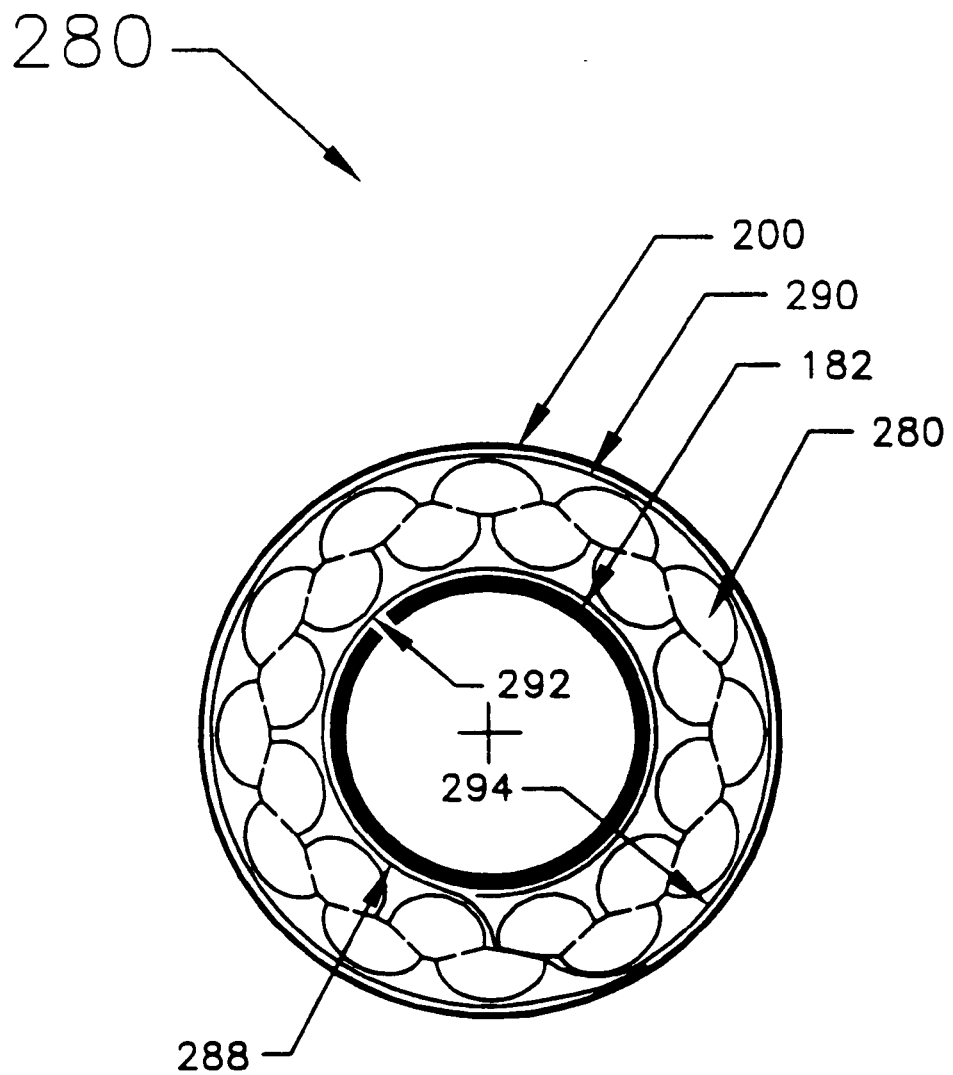
FIG. 17 is a cross-section end view of the bladder of FIG. 16-1 around a circular handle.

Air bladder 280 shown in FIGS. 16 and 17 is somewhat similar in construction to the three-layer air bladder 81 shown in FIG. 7. Air bladder 280 includes three layers 282, 283 and 284 of thermoplastic or other similar material that are bonded together along weld lines 30. The three layers 282, 283 and 284 form air cells 285 of a generally semi-circular cross-sectional shape. Small orifices 286 in the middle layer 283 allow air cells 285 to be interconnected and communicate with each other.

The two layers of offset air cells 285 of air bladder 280 provide an uninterrupted, continuous layer of air between the hand and the handle 182 of a tool or other object that is exposed to vibration or shock. Air bladder 280 thus has no voids between the hand and the handle 182. The absence of voids increases the effectiveness of air bladder 280 in reducing vibration or shock directed into the hand from the handle 182.

The two layers of generally semi-circular air cells 285 of air bladder 280 also allow a bladder with a larger overall thickness to be used around a small-diameter handle. For instance, the overall thickness of air bladder 280 may be in the range of about 0.25 to 0.5 inches or thicker. If a 0.5 inch thick air bladder 280 is used on a handle with an outer diameter of 1 inch, the outer circumference of the bladder 280 will be about 6.25 inches, twice the inner circumference of the bladder 280. Despite this large difference in circumference, the air bladder 280 of the present invention has excellent wear properties by avoiding excessive pinching and/or stretching. The semi-circular shape of the inner layer of air cells 285 (i.e., those air cells 285 between inside layer 284 and intermediate layer 283) allows the air bladder 280 to be bent into a circular configuration without compression of the inside surface of the bladder 280. Excessive pinching or compression of the inside surface of the bladder 280 is avoided. The weld lines 30 separating air cells 285 on the outer layer (i.e., those air cells 285 between intermediate layer 283 and outside layer 282) allow the air bladder to bent into a circular configuration without tensioning the outside surface of the bladder 280. Excessive stretching or tension of the outside surface of the bladder 280 is also avoided.

Bladder 280 has an "offset symmetry" about intermediate layer 283, that is, the air cells 285 on both layers are formed with the same generally semi-circular shape. Because of the offset symmetry, bladder 280 can be bent into a circular configuration in either direction, that is, bladder 280 may also be easily bent in the opposite direction with layer 282 forming the inside layer in the circular configuration.

The weld line attachment of layers 282 and 284 to intermediate layer 283 determines the cross-sectional shape of the air cells and whether this "offset symmetry" will exist. For instance, the semi-circular shape of air cells 285 is achieved by having a shorter length of the intermediate layer 283 between adjacent weld lines 30 than the length of the attached layer 282 or 284 between those weld lines 30. This is in contrast to the three layer configuration shown in FIG. 7, wherein a more triangular cross-sectional shape is provided by having a greater length of the intermediate layer 83 between adjacent weld lines 30 than the length of the attached layer 82 or 84 between those weld lines 30.

It is appreciated that other configurations of air cells 285 may be provided in a three-layer bladder. In particular, by having generally semi-circular air cells on one side of intermediate layer 283 and having more triangular air cells on the other side of intermediate layer 283, the "offset symmetry" will no longer exist and the bladder will have a tendency to flex or curl only in one direction.

Air bladder 280 has extension tabs 288 and 290 extending from both ends of the bladder 280. Extension tabs 288 and 290 are preferably integrally formed from one or more of layers 282, 283 and 284. For instance, extension tabs 288 and 290 may be formed by all three layers 282, 283 and 284, joined together by a continuous heat welding/sealing operation used to simultaneously form weld lines 30. Extension tabs 288 and 290 preferably extend for at least 60° around handle 182, or for at least one sixth of the length of the inflated fluid cavity. In the most preferred embodiment, extension tabs 288 and 290 extend 360° around handle 182.

Extension tabs 288 and 290 are used to attach air bladder 280 around handle 182, similar to the function performed by the inner liner 198 and cover layer 200 described with reference to FIGS. 14 and 15, and similar to the function performed by attachment tabs 126 described with reference to FIGS. 8 through 11. Extension tab 288 is affixed to handle 182, such as by means of an adhesive layer 292. The adhesive layer 292 may be a pressure sensitive adhesive which prevents rotation of extension tab 288 relative to handle 182. The pressure sensitive adhesive is preferably releasable, to readily allow removal of the bladder 280 from the handle 182 when the bladder 280 is unwound. Such a pressure sensitive, releasable adhesive allows the bladder 182 to be easily transferred between different handles. Alternatively, the adhesive layer 292 may be a setting or curing adhesive which can be used to permanently attach extension tab 288 to handle 182. The adhesive layer 292 may be applied along a selected portion or the entirety of extension tab 288, or may be applied to a selected portion or the entirety of the surface of the handle 182. An attachment length of at least 60° around handle 182, or at least one sixth of the length of the fluid cavity, has been found to adequately support the shear stresses associated with the rotational forces applied in most uses, while a shorter length may not adequately attach the bladder 280 to the handle 182.

The air bladder 280 is wrapped around the handle 182. The uninflated length of the fluid cavity of air bladder 280 should be somewhat longer than the circumference of the handle 182, as the fluid cavity shortens somewhat (typically 85 to 95%) upon inflation. In the preferred embodiment, the length of the inflated fluid cavity is the length of the circumference of the handle plus about six times the thickness of the inner layer of inflation cells 285. This length, when wrapped around handle 182 into the circular configuration shown in FIG. 17, allows both ends of the fluid cavity to contact with each other without overlapping. If desired, an additional layer of adhesive may be applied between the inside surface of the bladder 280 and the outside surface of extension tab 290.

Extension tab 290 is then wrapped around the outside layer of the air bladder 280 and secured. Preferably, a layer 294 of adhesive between the outside surface of the bladder 280 and the inside surface of extension tab 290 secures the bladder 280 in the wrapped position. The composition for the adhesive layer 194 for extension tab 290 may be identical to the adhesive layer 292 for extension tab 288. If desired, a cover layer 200 may be wrapped around the outside extension tab 290 of bladder 280.

The preferred overall thickness of air bladder 280 is 0.375 in. (9.5 mm). The calculated medium and high frequency vibration transmissibility values for this preferred 0.375 inch (9.5 mm) bladder are shown in FIG. 1-3. FIG. 1-3 indicates that for bladder 280 to simultaneously meet the requirements of EN/ISO 10819 (1995) for both values of $TR_M$ and $TR_H$, the thickness of the bladder material should be less than 0.010 inches.

An internal inflation check valve 296 is preferably molded into one of the air cells 285 of the bladder 280. Locating the inflation check valve 296 within the bladder 280 significantly simplifies the design requirements of the inflation mechanism for the air bladder 280.

An inflation sensor 298 can be used to insure that the air bladder 280 is inflated to the correct pressure. The inflation sensor 298 includes a sensing element or diaphragm 300 which is open on one side to fluid pressure in the bladder 280. In the preferred embodiment diaphragm is in the form of a plunger mounted to slide within the housing of inflation sensor 298. A spring 302 or other resilient element biases the diaphragm 300 to resist the air pressure in the bladder 280. Air pressure within the bladder 280 pushes against the plunger 300. When the air bladder is properly inflated, the plunger is pushed so as to be visible through a small hole 304, indicating proper inflation pressure.

Figures 1, 18:
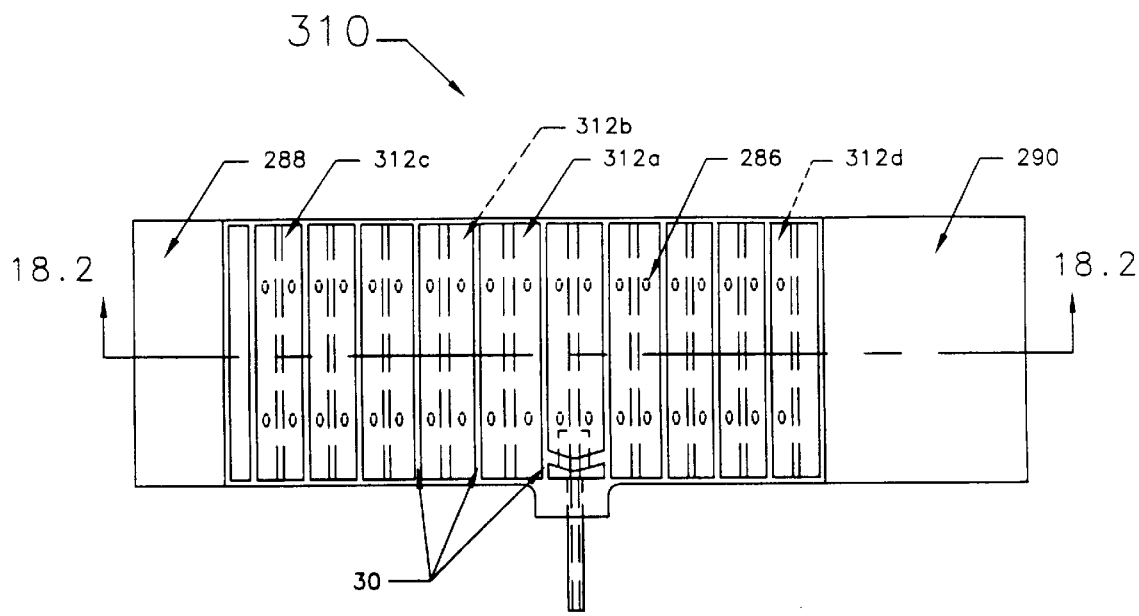
Figures 2, 18:
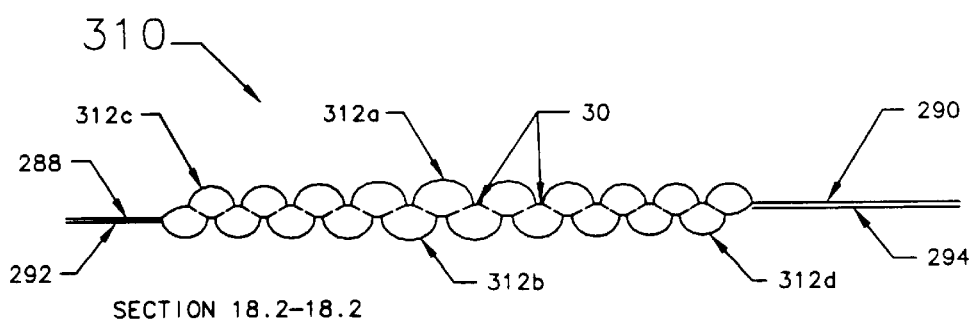
Figure 19:
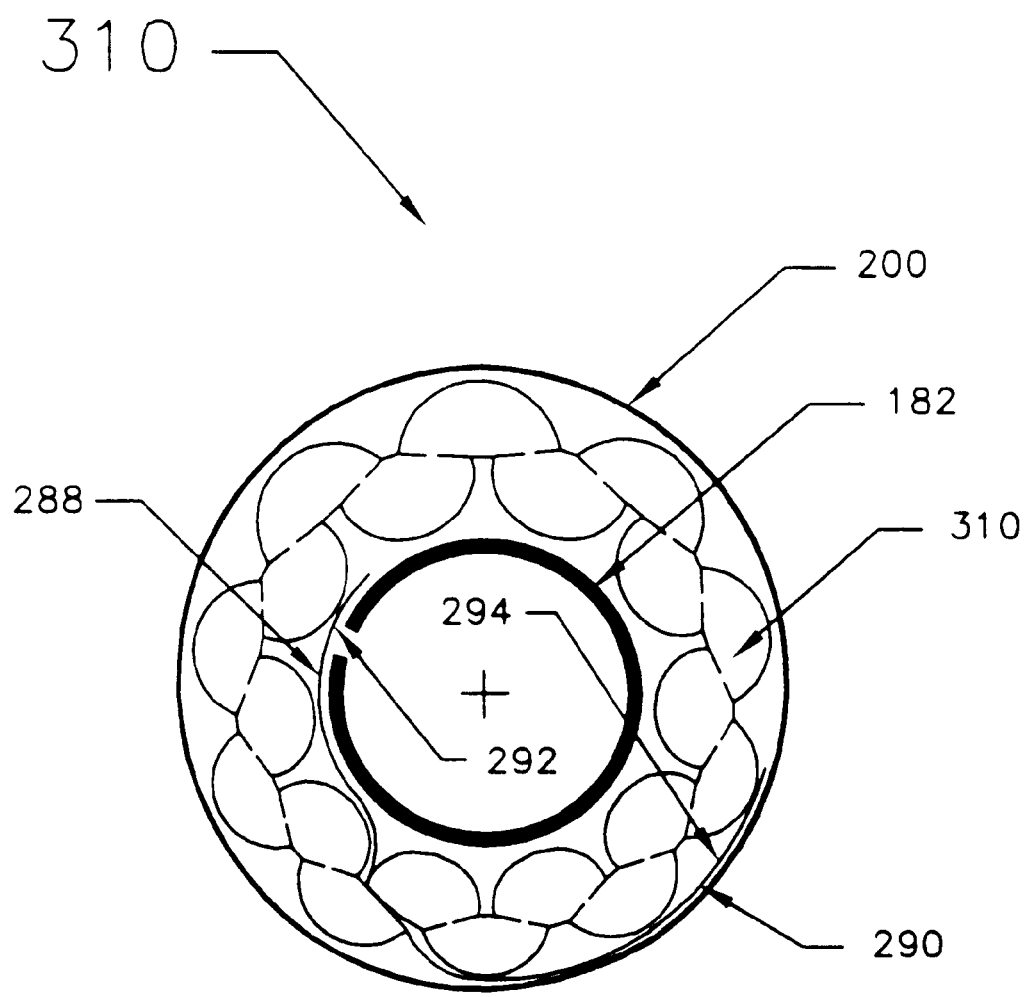
FIG. 19 is a cross-section end view of the bladder of FIG. 18-1 around a circular handle.

The air bladders of embodiments one through eleven have inside and outside surfaces that are essentially parallel to each other, with a uniform thickness throughout. FIGS. 18 and 19 show a twelfth embodiment of the invention, wherein the thickness of a bladder 310 varies along the surface of bladder 310. Air cells (such as 312a and 312b) in the center of bladder 310 are thicker than air cells (such as 312c and 312d) at the edges of the bladder. The thickness of the air cells 312 is varied by varying the spacing between the weld lines 30 along the surface of the bladder 310. The bladder 310 should be used with the thickest area of the bladder 310 absorbing the most force. Bladder 310 is particularly useful for tools which require exertion of large push forces, such as to push the tool into a work piece. The thicker air cells 312 prevent contact between the hand and the handle 182 even when a large push force is applied against them, and thus more effectively attenuate vibration in a large push force applications.

Figure 20:
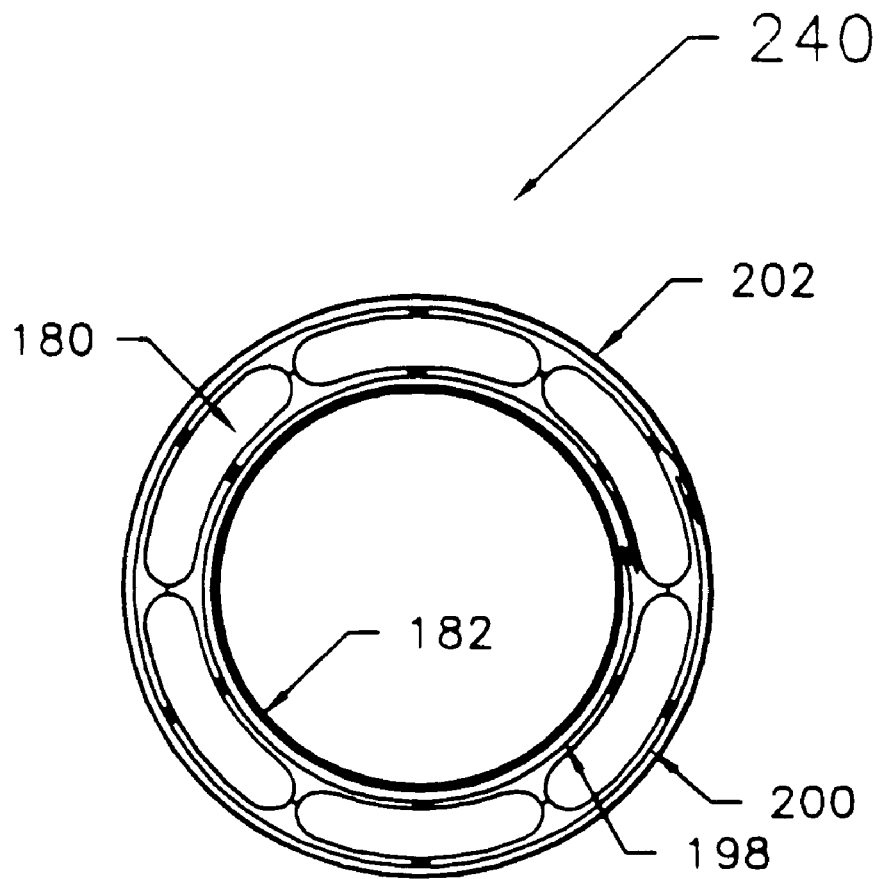
FIG. 20 is an end view of a second alternative bladder configuration around a circular handle.
Figure 21:
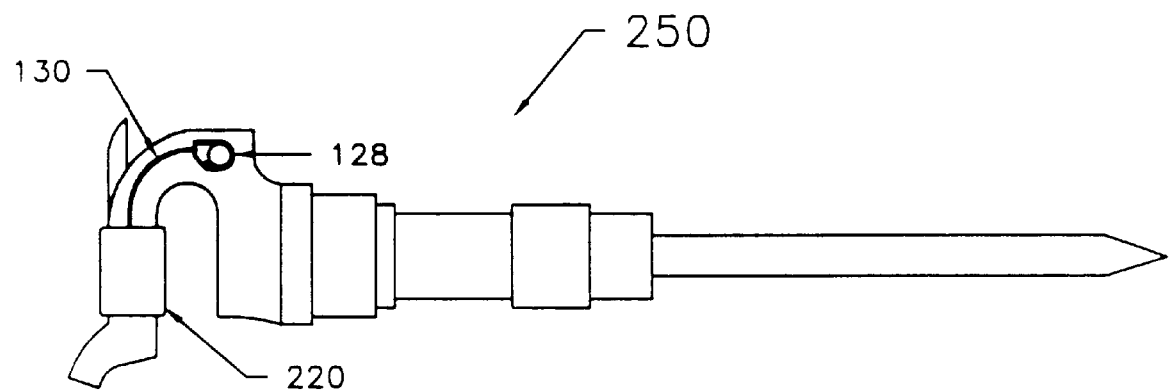
FIG. 21 is a side view of a chipping hammer fitted with the handle covering of FIG. 14.

FIG. 20 shows handle covering 240 which is comprised of bladder 180 wrapped around handle 182 where a rigid outer cover 202 is placed around bladder 180. Bladder 180 can be wrapped around handle 182 with or without an inner liner 198 and/or an outer covering 200 as described in FIG. 14. The rigid outer cover 202 can be made of molded plastic, thin metal, composite materials, molded elastomers, or other similar materials. The rigid outer cover 202 can be held in place and prevented from rotating around bladder 180 by means of an adhesive or bonding layer between the outer layer 190 of bladder 180 or the outer covering 200 between the outer layer 190 of bladder 180 and the bladder side of the rigid outer cover 202 or by means of the pressure of the inflated bladder 180 pushing between the handle 182 and the rigid outer cover 202. A rigid outer cover 202 can be placed around a bladder 180 wrapped around a handle with any curved or polygonal shaped. A rigid outer cover 202 can be used when a firm or solid hand grip is necessary for the proper use and control of a tool or other object that is clasped by a hand and that is exposed to vibration or shock. Workers skilled in the art will appreciate that bladders 280 or 310 may easily be substituted for bladder 180 in this configuration FIG. 21 shows an application of handle covering 220 applied to the handle of a chipping hammer. FIG. 21 shows a pump similar to pump 128 shown in FIGS. 8-2 through 8-4 attached to the chipping hammer near to the tool handle covering 220. Pump 128 with its associated pressure relief valve 138 can be used to adjust the inflation pressure of bladder 180 to suit the needs of the tool operator. Pump 128 is connected to tube 192 of bladder 180 by means of hose 130.

Figure 22:
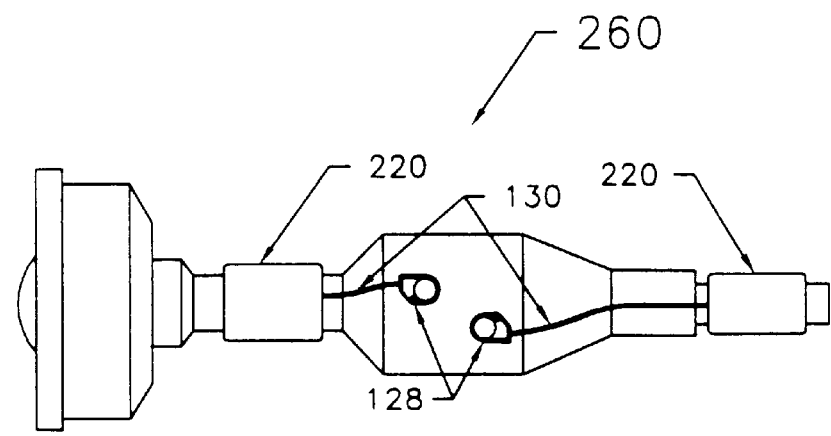
FIG. 22 is a side view of a horizontal grinder fitted with the handle covering of FIG. 14.

FIG. 22 shows an application of handle covering 220 applied to the two hand locations of a horizontal grinder. Two pumps similar to pump 128 shown in FIGS. 8-2 through 8-4 are attached to the horizontal grinder at locations near to each tool handle covering 220. Each pump 128 with its associated pressure relief valve 138 can be used to individually control the inflation pressure in bladder 180 of each tool handle covering 220 to suit the need of the tool operator. Each pump 128 is connected to tube 192 of its respective bladder 180 by means of a hose 130. It is also possible to use a single pump 128 to simultaneously inflate both bladders 180 of each hand covering 220.

FIGS. 21 and 22 show representative applications of handle covering 220. In addition, handle coverings 230 or 240 can be used, depending on the configuration of the tool handle or other object exposed to vibration or shock to which they may be attached. Any of the bladders described herein may be used in any of the attachment configurations. The methods described above can be used to apply an appropriately designed handle covering to any tool handle or other object that is clasped by the hand and that is exposed to vibration or shock.

The bladders in handle coverings can also be inflated by means of a pump that is not an integral part of the handle coverings as shown in FIGS. 21 and 22. A pump similar to pump 128 or other inflation device can be attached to tube 192 in bladder 180 by means of an inflation needle similar to ones used to inflate footballs, basket balls, etc. When bladder 180 has been inflated to the desired pressure, the inflation needle is removed from tube 192. The inflation pressure in bladder 180 is maintained by means of a check valve placed in tube 192 at the point where the inflation needle is inserted.

The designs of handle coverings 220, 230 and 240 along with air bladders 180, 280, 310 and their many possible different cell configurations provide several advantages. While the bladders and related handle coverings can be designed to fit specific handles, they can also be "generically" designed to fit around "classes" of handles. The handle coverings can be easily attached and removed from handles as needed to perform routine maintenance on tools and to replace damaged handle coverings. The placement of pump 128 and pressure relief valve 138 close to the handle coverings on a tool or other object exposed to vibration or shock makes it convenient and easy for the operator to adjust the inflation pressure of the bladder in the handle covering to meet his/her particular needs.

The desired inflation pressure of air bladders of the present invention is between 2.9 psi (20 kPa) and 15 psi (103 kPa). The lower inflation pressure of 2.9 psi (20 kPa) is required to prevent the air bladder from collapsing, allowing parts of the hand to make direct contact with a vibrating object clasped by the and, when the bladder is squeezed with a grip force of 5 lb (25 N) and/or pushed against the object with a push force of 10 lb (50 N). The upper inflation pressure is the pressure that can be easily achieved by pumps that can be made an integral part of a glove. Air bladder inflation pressures between 5.8 psi (40 kPa) and 8.7 psi (60 kPa) are optimum pressures from an overall design standpoint when considering pump and air bladder design and desired vibration or shock protection.

The air bladders described in these preferred embodiments of FIGS. 2-18 serve as an air spring which is very effective in reducing vibration or impact energy transmitted to the hand. Referring back to FIG. 1-1, the vibration transmissibility curves illustrate several characteristics of the use of an air isolation bladder to reduce the vibration energy transmitted to the hand. Firstly, the effectiveness of the air isolation bladder in reducing vibration energy directed into the hand generally increases as the thickness of the air in the bladder increases. The ⅜ in. (9.5 mm) thick bladder was generally most effective, while the ⅛ in. (3.2 mm) thick bladder was generally least effective. It is believed that this difference is due in part to a greater volume of air in the larger diameter bladder, allowing a larger attenuation of vibration energy during air compression and expansion.

Secondly, the effectiveness of the air isolation bladder is related to the frequency of the vibrations. The ⅛ in. (3.2 mm) and ¼ in. (6.4 mm) thick air isolation bladders tested were very effective at reducing vibration energy at frequencies over 300–400 Hz (the effectiveness increased with increasing diameter of the air bladder cells). They were moderately effective at frequencies less than 300 Hz. The ⅜ in. (9.5 mm) thick bladder was effective at all frequencies shown in FIG. 1-1. It is believed that the beneficial effect to the air isolation bladder is related to the time delay which occurs for air compression forces to be transmitted through the air cells. That is, air within the cell will not compress uniformly during each vibration cycle. Rather, force is transmitted through the air cell in a compression or sound wave, which does not travel instantaneously and does not compress air uniformly within the cell. It is believed that the compression energy of higher frequency vibrations is not effectively transmitted prior to the next vibration cycle, and thus high frequency energy is more effectively dissipated by the air isolation bladders. For lower frequency vibrations, it is believed that more of the compression energy is transmitted prior to the next vibration cycle, and thus the air isolation bladder does not work as effectively at lower frequencies.

It is believed that all of the particular values for vibration transmissibility are dependant upon the particular configuration of the air isolation bladder tested, but that similar characteristics would be observed in all isolation bladders. For example, bladders with different cell configurations, such as those shown in FIGS. 2, 8, 10 and 11, but the same thickness will have similar vibration transmissibility characteristics.

The use of an air bladder to reduce the transmission of vibration and impact energy directed into the hand provides numerous benefits over prior art elastomeric, foam or rubber filled gloves or handle wraps. In particular, the air isolation hand covering has the following properties and functions:

1. The air isolation hand and handle covering has vibration isolation properties that are determined by the shape and configuration of the air bladder, the pressure in the bladder, the volume of the bladder, the compressible fluid used, and the grip force and push force used when clasping a tool or other object. Each of these parameters can be modified as desired for maximum vibration isolation for the particular use contemplated.
2. The air isolation hand and handle covering can be designed with sufficient air volume and air pressure in the air bladder so that the bladder will always maintain an air layer between the hand and tool or other object, irrespective of the grip and push forces employed during the operation associated with using the tool or other similar device.
3. The air bladder in the air isolation hand and handle covering can be filled with air during fabrication of the bladder, or it can be inflated or deflated by means of a small air pump and integral check and air-release valve connected to one of the air cavities of the bladder.
4. If the air bladder in the air isolation hand and handle covering is inflated by means of a small air pump and integral check and air-release value connected to one of the air cavities of the bladder, the air pressure in the air bladder can be controlled to adapt to the different needs of the wearers of the air isolation hand covering or tool applications for a handle covering.
5. The air isolation hand covering is a lightweight glove that is comfortable to wear and that easily conforms to the different shapes of tool handles and other objects that may by clasped with the gloves. This significantly reduces the hand fatigue that is often associated with gloves that contain elastomer or rubberlike vibration isolation pads that are often stiff.
6. The thermoplastic or other flexible material used to construct the air bladder in the air isolation hand covering can also be used to completely enclose the fingers and palm of the hand, providing effective lightweight thermal insulation to keep the hand warm.
7. The air isolation handle covering is a tool handle covering that both effectively reduces vibration energy directed into the hand and can be easily fabricated to conform to any tool handle shape.
8. By significantly reducing the vibration energy that is directed into the hand, the air isolation hand and handle covering can significantly reduce the tingle and numbness in the fingers and the hand fatigue that is experience when clasping vibrating hand tools or other vibrating objects.
9. By significantly reducing the vibration energy that is directed into the hand, the air isolation hand and handle covering can significantly reduce the incidence of VWF in worker populations or significantly increase the time period before symptoms associated with VWF begin to appear in worker populations.
10. By significantly reducing the vibration energy that is directed into the hand, the air isolation hand and handle covering can significantly reduce the discomfort that is associated with working with vibrating hand tools or holding onto vibrating objects.
11. The hand and handle covering meets the requirements of European Standard prEM-150 10819 (1995) for the covering to be classified as a "vibration isolation" or "antivibration" covering.

Although the present invention has been described with reference to preferred embodiments, workers skilled in the art will recognize that changes may be made in form and detail without departing from the spirit and scope of the invention.

What is claimed is:

1. A handle covering for reducing vibration from being transmitted to a user's hand from a handle, the handle covering comprising:

a bladder defining a fluid cavity for retaining compressible fluid, the bladder being formed of a first layer of fluid-impervious material and a second layer of fluid-impervious material sealed together along a peripheral seal, with the fluid cavity formed between the first layer and the second layer within the peripheral seal, the fluid cavity having a first edge and an opposing second edge with an inflated length and an uninflated length between the first edge and the second edge, the bladder being flexible both when inflated and when uninflated to allow the bladder to be wrapped in a circumferential configuration about an axis with its length curved 360° and with the first edge and the second edge extending generally linearly and parallel to the axis of the circumferential configuration; and a first attachment tab integrally formed from at least one of the first layer and the second layer, the first attachment tab extending from one of the first edge and the second edge of the fluid cavity with a length which is at least about one sixth the inflated length of the fluid cavity so when the bladder is wrapped in the circumferential configuration the first attachment tab extends circumferentially at least about 60°, the first attachment tab for attaching the bladder to a handle.

2. The handle covering of claim 1, wherein the first attachment tab includes a handle facing side, and further comprising:

an adhesive layer exposed on the handle facing side of the first attachment tab for adhesively attaching the handle facing side of the first attachment tab to a handle.

3. The handle covering of claim 1, wherein the first attachment tab includes means for removably attaching the first attachment tab to a handle such that the bladder can be readily moved between handles.

4. The handle covering of claim 1, further comprising:

a second attachment tab integrally formed from at least one of the first layer and the second layer, the second attachment tab extending from the fluid cavity opposite the first attachment tab with a length which is at least about one sixth the inflated length of the fluid cavity so when the bladder is wrapped in the circumferential configuration the second attachment tab extends circumferentially at least about 60°, the second attachment tab for securing the bladder circumferentially around a handle.

5. The handle covering of claim 4, wherein the second attachment tab includes a fluid cavity facing side, and further comprising:

an attachment layer exposed on the fluid cavity facing side of the second attachment tab for attaching the second attachment tab to an outer surface of one of the first layer and the second layer.

6. The handle covering of claim 5, wherein the attachment layer is an adhesive layer.

7. The handle covering of claim 5, wherein the attachment layer is a hook and loop fabric.

8. The handle covering of claim 1 in combination with a handle having a circumference, wherein the uninflated length of the fluid cavity is greater than the circumference of the handle.

9. The handle covering of claim 8 wherein the inflated length of the fluid cavity corresponds to the circumference of the handle when the inflated fluid cavity is wrapped 360° around the handle such that there is no overlap of the inflated fluid cavity and there is complete coverage of the fluid cavity over the circumference of the handle.

10. The handle covering of claim 1, wherein the first layer and the second layer are connected together at a plurality of weld lines to form a plurality of inflation cells, wherein thickness of the bladder in an inflated state at any location of the bladder is determined by spacing to adjacent weld lines, and wherein spacing between weld lines varies such that the thickness of the bladder in an inflated state varies at different inflation cells.

11. The handle covering of claim 1, wherein the first layer and the second layer are connected together at a plurality of weld lines to form a plurality of inflation cells, and wherein the plurality of inflation cells are interconnected so as to allow inflation from a single source.

12. The handle covering of claim 1, wherein the first layer and the second layer are connected together through a grid pattern of weld points.

13. The handle covering of claim 1, further comprising:
a pump for inflating the bladder in fluid communication with the fluid cavity; and
a release valve for releasing compressible fluid from within the bladder in fluid communication with the fluid cavity.

14. The handle covering of claim 1, further comprising:
a pressure sensor in fluid communication with the fluid cavity for indicating whether the bladder is inflated to a sufficient pressure.

15. The handle covering of claim 1, further comprising:
an outer cover placed around the bladder, wherein the outer cover is rigid.

16. The handle covering of claim 1 wherein the first layer has a thickness of from 0.005 to 0.007 inches.

17. The handle covering of claim 1 attached around a handle with a handle longitudinal axis such that the first edge and the second edge extend substantially parallel to the handle longitudinal axis.

18. The handle covering of claim 1, wherein the first layer and the second layer are connected together at a plurality of weld lines to form a plurality of inflation cells, wherein the first layer and the second layer are also connected together through a grid pattern of weld points, and wherein the plurality of inflation cells are interconnected so as to allow inflation from a single source.

19. A handle covering for reducing vibration from being transmitted to a user's hand from a handle, the handle covering comprising:
a bladder defining a fluid cavity for retaining compressible fluid, the bladder being formed of a first layer of fluid-impervious material and a second layer of fluid-impervious material sealed together along a peripheral seal, with the fluid cavity formed between the first layer and the second layer within the peripheral seal, the fluid cavity having an inflated length and an uninflated length, and further comprising an intermediate layer of fluid impervious material between the first layer and the second layer, the intermediate layer being bonded to the first layer at discreet divisions which define a plurality of inflation cells between the first layer and the intermediate layer, and the intermediate layer being bonded to the second layer at discreet divisions which define a plurality of inflation cells between the second layer and the intermediate layer; and
a first attachment tab integrally formed from at least one of the first layer and the second layer, the first attachment tab extending from the fluid cavity with a length which is at least about one sixth the inflated length of the fluid cavity, the first attachment tab for attaching the bladder to a handle.

20. The handle covering of claim 11, wherein the first layer has a thickness of less than 0.010 inches; and wherein the second layer has a thickness of less than 0.010 inches.

21. The handle covering of claim 20, wherein the bladder has an overall inflated thickness of 0.5 inches or less.

22. A handle covering for reducing vibration from being transmitted to a user's hand from a handle, the handle covering comprising:
a bladder defining a fluid cavity for retaining compressible fluid, the bladder being formed of a first layer of fluid-impervious material and a second layer of fluid-impervious material sealed together along a peripheral seal, with the fluid cavity formed between the first layer and the second layer within the peripheral seal, the fluid cavity having an inflated length and an uninflated length;
a first attachment tab integrally formed from at least one of the first layer and the second layer, the first attachment tab extending from the fluid cavity with a length which is at least about one sixth the inflated length of the fluid cavity, the first attachment tab for attaching the bladder to a handle; and
a pressure sensor in fluid communication with the fluid cavity for indicating whether the bladder is inflated to a sufficient pressure, wherein the pressure sensor comprises:
a housing;
a diaphragm within the housing and open to fluid pressure in the fluid cavity; and
a spring biasing the diaphragm against the fluid pressure in the fluid cavity;
wherein location of the diaphragm within the housing indicates the fluid pressure in the bladder.

23. A handle covering for reducing vibration from being transmitted to a user's hand from a handle, the handle covering comprising:
a bladder defining a fluid cavity for retaining compressible fluid, the bladder being formed of a first layer of fluid-impervious material and a second layer of fluid-impervious material sealed together along a peripheral seal, with the fluid cavity formed between the first layer and the second layer within the peripheral seal, the first layer and the second layer being connected together along a plurality of weld lines to form a plurality of inflation cells, wherein thickness of the bladder in an inflated state at any location of the bladder is determined by spacing of adjacent weld lines, wherein spacing between weld lines varies such that the thickness of the bladder in an inflated state varies at different inflation cells.

* * * * *